US010708091B2

(12) United States Patent
Fechtel

(10) Patent No.: US 10,708,091 B2
(45) Date of Patent: Jul. 7, 2020

(54) CHANNEL ESTIMATION CIRCUITS AND METHODS FOR ESTIMATING COMMUNICATION CHANNELS

(71) Applicant: Intel IP Corporation, Santa Clara, CA (US)

(72) Inventor: Stefan Fechtel, Zorneding (DE)

(73) Assignee: Intel IP Corporation, Santa Clara ( * ) Notice: Subject to any disclaimer, the term of this patent is extended or adjusted under 35 U.S.C. 154(b) by 0 days.

(21) Appl. No.: 16/485,799

(22) PCT Filed: Feb. 5, 2018

(86) PCT No.: PCT/US2018/016787
§ 371 (c)(1),
(2) Date: Aug. 14, 2019

(87) PCT Pub. No.: WO2018/169620
PCT Pub. Date: Sep. 20, 2018

(65) Prior Publication Data
US 2020/0052931 A1 Feb. 13, 2020

(30) Foreign Application Priority Data

Mar. 16, 2017 (EP) .................................... 17161243

(51) Int. Cl.
*H04L 25/02* (2006.01)
*H04L 5/00* (2006.01)
*H04L 25/03* (2006.01)

(52) U.S. Cl.
CPC ........ *H04L 25/0248* (2013.01); *H04L 5/0048* (2013.01); *H04L 25/021* (2013.01); *H04L 25/022* (2013.01); *H04L 25/03159* (2013.01)

(58) Field of Classification Search
CPC ........... H04L 25/0248; H04L 25/03159; H04L 25/021; H04L 25/022; H04L 5/0048
See application file for complete search history.

(56) References Cited

U.S. PATENT DOCUMENTS 7,006,800 B1 2/2006 Lashkarian et al.
9,219,629 B1 12/2015 Sun et al.
(Continued)

FOREIGN PATENT DOCUMENTS

EP 2685686 A1 1/2014

OTHER PUBLICATIONS

Vidhyacharan Bhaskar et al.: "Performance analysis of subspace based downlink channel estimation for W-CDMA systems using chaotic codes".
(Continued)

*Primary Examiner* — Dac V Ha
(74) *Attorney, Agent, or Firm* — 2SPL Patent Attorneys

(57) ABSTRACT

A channel estimation circuit (100) includes an input interface (110). The input interface (110) is configured to receive a plurality of pilot symbols from a communication channel. Furthermore, the channel estimation circuit (100) includes processing circuitry (120). The processing circuitry (120) is configured to generate a channel autocorrelation matrix and at least one channel cross-correlation vector. The generating of the channel autocorrelation matrix and the channel cross-correlation vector can be based on predetermined statistical information on the communication channel. Additionally, the processing circuitry (120) is configured to generate a subspace mapping for a subspace transformation based on the channel autocorrelation matrix. Additionally, the processing circuitry (120) is configured to generate a subspace transformed channel autocorrelation matrix, at least one subspace transformed channel cross-correlation vector, and a plurality of subspace transformed pilot symbols, by applying the subspace mapping to the channel autocorrelation matrix, the channel cross-correlation vector, and to the plurality of pilot symbols. Additionally, the processing circuitry (120) is configured to generate a plurality of subspace
(Continued)

channel estimation filter coefficients based on the subspace transformed channel autocorrelation matrix and the subspace transformed channel cross-correlation vector. Additionally, the processing circuitry (120) is configured to generate an estimate of at least one channel coefficient of the communication channel based on the subspace transformed pilot symbols and the subspace channel estimation filter coefficients. Furthermore, the channel estimation circuit (100) includes an output interface (150) configured to provide the estimate of the at least one channel coefficient.

20 Claims, 5 Drawing Sheets

(56) References Cited

U.S. PATENT DOCUMENTS

| | | |
|---|---|---|
| 2004/0240570 A1 | 12/2004 | Alard et al. |
| 2010/0040091 A1 | 2/2010 | Kamalizad et al. |
| 2010/0067366 A1 | 3/2010 | Nicoli |
| 2010/0177251 A1* | 7/2010 | Kimura ............... H04L 27/2647 348/726 |
| 2012/0207254 A1 | 8/2012 | Park et al. |
| 2015/0333933 A1* | 11/2015 | Lopez de Victoria ...................... H04L 25/0224 375/343 |

OTHER PUBLICATIONS

Kishore Jaganathan et al.: "Reconstruction of signals from their autocorrelation and cross-correlation vectors, with applications to phase retrieval and blind channel estimation".

Özdemir et al.: "Toward real-time adaptive low-rank LMMSE Channel estimation of MIMO-OFDM Systems".

Mehmet Kemal Özdemir et al.: "Channel estimation for wireless ofdm Systems".

Noh M et al.: "Low complexity LMMSE Channel estimation for OFDM".

3GP TS 36.211: "Physical channels and modulation", V.14.0.0.

* cited by examiner

US 10,708,091 B2
CHANNEL ESTIMATION CIRCUITS AND METHODS FOR ESTIMATING COMMUNICATION CHANNELS

FIELD

Examples relate to channel estimation circuits, telecommunication devices, and methods for estimating communication channels.

BACKGROUND

In communication systems channel estimation is one of the most complex receiver functions in terms of computational load and memory footprint. It has to cope with various conditions such as channel selectivity, interference, and noise. Due to the demand of reducing computational load and memory footprint novel concepts are sought. Such a demand may at least be partially satisfied by the subject matter of the present disclosure.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
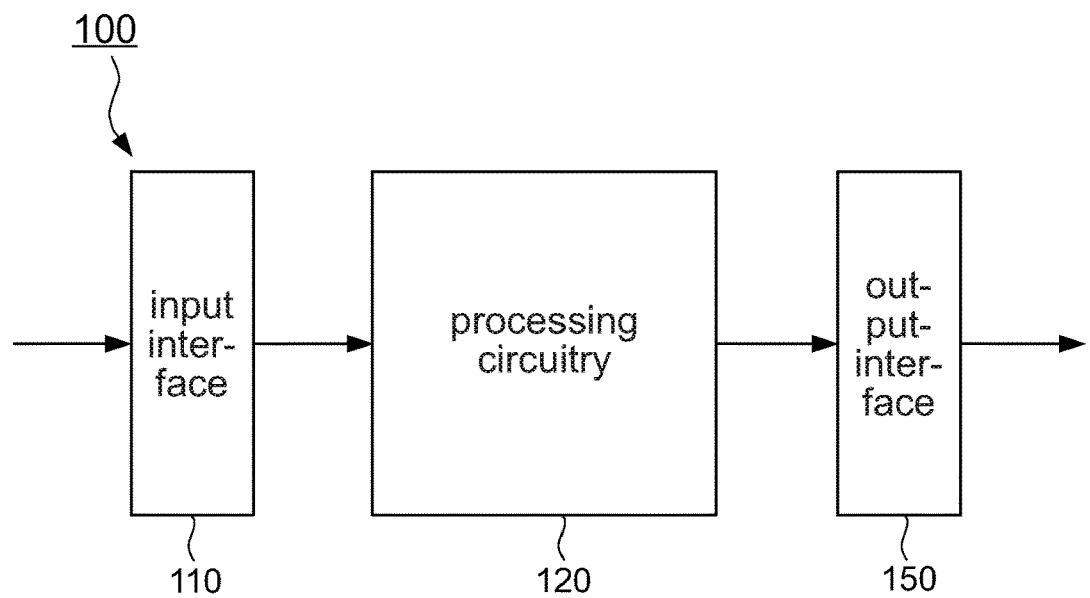
FIG. 1 shows a block diagram of a channel estimation circuit.

FIG. 1 shows a block diagram of a channel estimation circuit 100. The channel estimation circuit 100 comprises an input interface 110. The input interface 110 is configured to receive a plurality of pilot symbols from a communication channel. Furthermore, the channel estimation circuit 100 comprises processing circuitry 120. The processing circuitry 120 is configured to generate a channel autocorrelation matrix and at least one channel cross-correlation vector. The generating of the channel autocorrelation matrix and the channel cross-correlation vector can be based on predetermined statistical information on the communication channel. Additionally, the processing circuitry 120 is configured to generate a subspace mapping for a subspace transformation based on the channel autocorrelation matrix. Additionally, the processing circuitry 120 is configured to generate a subspace transformed channel autocorrelation matrix, at least one subspace transformed channel cross-correlation vector, and a plurality of subspace transformed pilot symbols, by applying the subspace mapping to the channel autocorrelation matrix, the channel cross-correlation vector, and to the plurality of pilot symbols. Additionally, the processing circuitry 120 is configured to generate a plurality of subspace channel estimation filter coefficients based on the subspace transformed channel autocorrelation matrix and the subspace transformed channel cross-correlation vector. Additionally, the processing circuitry 120 is configured to generate an estimate of at least one channel coefficient (e.g., a first channel coefficient) of the communication channel based on the subspace transformed pilot symbols and the subspace channel estimation filter coefficients. Furthermore, the channel estimation circuit 100 comprises an output interface 150 configured to provide the estimate of the at least one channel coefficient.

The subspace referred to herein can be thought of a subspace of the channel autocorrelation matrix. That is to say, a set of eigenvectors of the channel autocorrelation matrix can span a vector space. This vector space can be regarded as an observation space, where, for example, the plurality of pilot symbols can be observed (e.g., received and/or measured). The subspace can be spanned by a subset of the eigenvectors of the channel autocorrelation matrix and may hence have a reduced dimension with respect to the observation space. Alternatively, the subspace may be accessed by other means, such as a QR-decomposition and/or a Cholesky-decomposition of the channel autocorrelation matrix.

The concept of transforming the received plurality of pilot symbols into the subspace, generating subspace channel estimation filter coefficients, and generating an estimate of a channel coefficient based on the subspace transformed pilot symbols and the subspace channel estimation filter coefficients can be referred to as subspace channel estimation (CE) filtering. The plurality of subspace transformed pilot symbols can comprise less pilot symbols than the plurality of (non transformed) pilot symbols. This can reduce the memory footprint (and/or memory area) of the channel estimation circuit 100 for storing the plurality of pilot symbols and can also accelerate the estimation of the channel coefficient. Furthermore, a coefficient memory of the channel estimation circuit 100 for storing the plurality of subspace channel estimation filter coefficients may be reduced with respect to a coefficient memory that would store channel estimation filter coefficients to be applied to the (non transformed) pilot symbols in the observation space. Moreover, even though the estimate of the channel coefficient may be generated based on the subspace transformed pilot symbols and the subspace channel estimation filter coefficients, it can represent the communication channel in the observation space. Hence, there may be no need to transform the estimate of the channel coefficient back into the observation space. This can reduce computational load for the channel estimation circuit 100.

Figure 2:
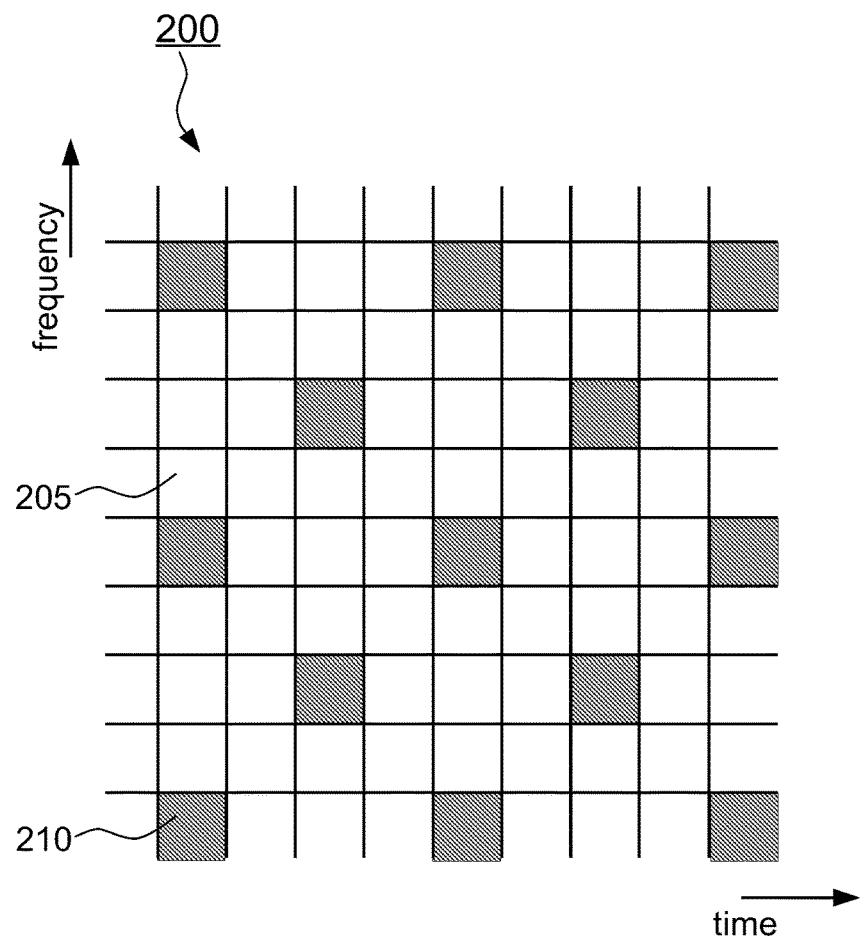
FIG. 2 shows a frequency-time plane of a communication channel.

The communication channel may be visualized in a frequency-time plane 200 as shown in FIG. 2. A horizontal axis of the frequency-time plane 200 represents time and a vertical axis represents frequency. The time dimension can be divided into time slots of the communication channel, while the frequency dimension can be divided into subcarriers of the communication channel. Each square (both the clear squares 205 and the shaded squares 210) of the frequency-time plane 200 represents a radio resource element of the communication channel. A radio resource element can comprise a single time slot and a single subcarrier and can hence be the smallest discrete part of the communication channel (e.g., of a frame transmitted via the communication channel). Each radio resource element can be associated with a channel coefficient that can represent the distortion of a symbol which is communicated at this radio resource element. It is a goal of channel estimation to estimate the channel coefficient for at least some (or all) radio resource elements of the communication channel. To this end, during telecommunication pilot symbols can be transmitted over the communication channel. This can be done for some of the radio resource elements. In FIG. 2, these radio resource elements are represented by the shaded squares 210. Since a receiver of the telecommunication can a priori know how the (undistorted) pilot symbols look like and can compare these to the distorted received pilot symbols, the receiver can determine the channel coefficients for the radio resources elements 210 that are associated with pilot symbols. Other radio resource elements (the ones represented by the cleared squares 205) can be used for communicating data (e.g., payload data) via the communication channel and do not carry pilot symbols. The channel coefficients (or at least some of them) of the radio resource elements 205 can then be estimated by the receiver based on the channel coefficients determined from the pilot symbols.

Turning back to FIG. 1, the processing circuitry 120 can be configured to generate the channel autocorrelation matrix by computing correlation coefficients between channel coefficients of radio resource elements of the communication channel that are associated with the plurality of pilot symbols (e.g., the radio resource elements 210).

This does not necessarily require the processing circuitry 120 to have knowledge of the channel coefficients of the radio resource elements that are associated with the plurality of pilot symbols. For example, the processing circuitry 120 can be configured to make an assumption of a maximal Doppler shift and/or a maximal delay spread of the communication channel and feed at least one of these two parameters into a (statistical) channel model of the communication channel. For instance, the channel model can be a rectangular channel model, a Jakes channel model, an exponential channel model, or a Rayleigh channel model. Speaking in terms of FIG. 2, correlation coefficients (e.g., both autocorrelation and/or cross correlation coefficients) between channel coefficients associated with the shaded squares 210 of the frequency-time plane 200 can be generated by the processing circuitry. This can comprise for each shaded square 210 to generate (e.g., compute) a channel autocorrelation coefficient with itself and to generate (e.g., compute) a respective channel cross-correlation coefficient with each of the other shaded squares 210.

Coming again back to FIG. 1, the processing circuitry 120 can be configured to generate the channel cross-correlation vector by computing correlation coefficients between the channel coefficient to be estimated and channel coefficients of radio resource elements of the communication channel that are associated with the plurality of pilot symbols. As for the channel autocorrelation matrix, this can be accomplished by using the made assumption of the maximal Doppler shift and/or the maximal delay spread and feeding at least one of these two parameters into the chosen channel model, for example.

For example, the processing circuitry 120 can be configured to generate the estimate of the at least one channel coefficient being associated with a radio resource element of the communication channel that is different from any radio resource element associated with the plurality of pilot symbols. Explaining this in terms of FIG. 2, the respective correlation coefficients of the channel cross-correlation vector can thus correspond to cross-correlation coefficients between one clear square 205 (e.g., the radio resource element for which the channel coefficient is to be estimated and for which a pilot symbol is not transmitted) and respective shaded squares 210 (e.g., the radio resource elements for which pilot symbols are transmitted). In other words, a pilot symbol might not be transmitted for the radio resource element whose channel coefficient is to be estimated. Instead this radio resource element may carry a data symbol (e.g., a payload data symbol). By providing an estimate of its channel coefficient, distortions of this data symbol due to its propagation across the communication channel may be reversed at a telecommunication device comprising the channel estimation circuit 100.

Additionally or alternatively, the processing circuitry 120 can be configured to generate the estimate of a channel coefficient being associated with a radio resource element associated with a pilot symbol (e.g., occupied by a pilot symbol). That is to say, a pilot symbol of the plurality of pilot symbols may be received also for the radio resource element whose channel coefficient is to be estimated, such that the channel cross-correlation vector can comprise cross-correlation coefficients between one (particular) shaded square 210 and the other shaded squares 210.

The input interface 110 can be configured to receive measurement data of the maximal Doppler shift and/or the maximal delay spread of the communication channel. The processing circuitry 120 can then further be configured to generate the channel autocorrelation matrix and/or the channel cross-correlation vector based on the (measured) maximal Doppler shift and/or the (measured) maximal delay spread. For example, the processing circuitry 120 can be configured to feed the measurement data of the maximal Doppler shift and/or the maximal delay spread into a channel model to generate the channel autocorrelation matrix and/or the channel cross-correlation vector. For example, the measurement data may correspond to pilot symbols previously sent across the communication channel. The assumed and/or measured maximal Doppler shift and/or the maximal delay spread as well as the chosen channel model can be understood as predetermined statistical information on the communication channel.

Additionally or alternatively, the input interface 110 can be configured to receive measurement data of at least one Doppler power profile and/or a delay power profile of the communication channel. The processing circuitry 120 can then further be configured to generate the channel autocorrelation matrix and the channel cross-correlation vector based on at least one of the Doppler power profile and delay power profile. Likewise, a measured Doppler power profile and/or a measured delay power profile can be understood as predetermined statistical information on the communication channel.

The processing circuitry 120 can be configured to generate the subspace mapping by computing eigenvalues and eigenvectors of the channel autocorrelation matrix. To generate the subspace mapping, the processing circuitry 120 can further be configured to use those eigenvectors for the subspace mapping whose corresponding eigenvalues are larger than a predefined (first) threshold. For example, those eigenvectors whose corresponding eigenvalues are larger than the predefined threshold can be arranged in a subspace mapping matrix (e.g., as the columns or alternatively as the rows of the subspace mapping matrix). The subspace mapping matrix can represent a linear transformation from the observation space into the subspace.

Additionally, the processing circuitry 120 can further be configured to set the predefined threshold to a fraction of the largest eigenvalue of the channel autocorrelation matrix. For example, the processing circuitry 120 can be configured to set the predefined threshold to larger than 0.1% (or larger than 0.5%, or larger than 1%) and/or smaller than 10% (or smaller than 2%, or smaller than 1%, or smaller than 0.5%) of the largest eigenvalue of the channel autocorrelation matrix. To this end, the processing circuitry 120 can be configured to compute all eigenvalues of the channel autocorrelation matrix, to determine the largest eigenvalue, to then determine the predefined threshold, and to select those eigenvectors for the subspace mapping whose corresponding eigenvalues are larger than the predefined threshold.

Alternatively to computing an eigendecomposition of the channel autocorrelation matrix, the processing circuitry 120 can be configured to generate the subspace mapping by other subspace generating techniques. For example, the processing circuitry 120 can be configured to generate the subspace mapping by computing a QR-decomposition, a Cholesky-decomposition, and/or a singular value decomposition of the channel autocorrelation matrix.

According to some examples, the processing circuitry 120 can further be configured to compute a signal-to-interference-plus-noise ratio (SINR) profile of the communication channel based on the plurality of pilot symbols. In addition, the processing circuitry 120 can be configured to scale the subspace mapping by the SINR profile. To this end, the SINR profile may be represented by a diagonal matrix that can be of the same size as the channel autocorrelation matrix. Entries on the main diagonal of the matrix representing the SINR profile may correspond to respective signal-to-interference-plus-noise ratios of respective radio resource elements associated with the plurality of pilot symbols. Scaling of the subspace mapping by the SINR profile may then be performed by multiplying a matrix associated with the subspace mapping (e.g., the subspace mapping matrix) with the diagonal matrix representing the SINR profile. In this way, pilot symbols superimposed by interference and/or noise present in the communication channel may less affect the generation of the subspace mapping and hence falsifying effects of interference and/or noise on the estimation of the channel coefficient (or channel coefficients) can be reduced. Alternatively, the processing circuitry 120 can be configured to compute a signal-to-interference ratio (SIR) profile or a signal-to-noise ratio (SNR) profile of the communication channel based on the plurality of pilot symbols and to scale the subspace mapping by the SIR profile or the SNR profile, respectively.

For example, the input interface 110 can be configured to receive measurement data of at least one signal-to-noise profile or signal-to-interference-plus-noise power profile of the plurality of pilot symbols. This can facilitate computing the SINR profile and/or the SIR profile and/or the SNR profile of the communication channel at the processing circuitry 120.

The input interface 110 can be configured to limit the number of pilot symbols of the plurality of pilot symbols to cause a maximal frequency difference between two pilot symbols of the plurality of pilot symbols being smaller than 90% (or smaller than 85%) of a coherence bandwidth of the communication channel and being larger than 70% (or larger than 75%) of the coherence bandwidth. If the input interface 110 is configured to receive measurement data of at least one of a maximal Doppler shift and a maximal delay spread, the input interface 110 may compute the coherence bandwidth from this measurement data.

By limiting the number of pilot symbols in the described manner, subspace channel estimation as performed by the channel estimation circuit 100 can be designed such that it meets a certain performance target for a worst-case channel selectivity (e.g., maximal Doppler shift and/or maximal delay spread) at minimal cost (e.g., memory footprint). A sweet spot of subspace channel estimation can be the configuration that best matches the actual channel selectivity in terms of both runtime complexity reduction and performance improvement. In other words, a larger number of pilot symbols used for the estimation of a channel coefficient can make the estimation more accurate, however, may also increase runtime complexity and memory footprint. On the other hand, a smaller number of pilot symbols can reduce runtime complexity and memory footprint, which, however, may come at the expense of reduced channel estimation accuracy. A limitation of the number of pilot symbols of the plurality of pilot symbols as suggested above may provide the best tradeoff between channel estimation accuracy and runtime complexity and/or memory footprint.

The maximal frequency difference between two pilot symbols of the plurality of pilot symbols is to be understood as follows: Each pilot symbol can be associated with a frequency which corresponds to the (center) frequency (e.g., subcarrier frequency) of the radio resource element that is occupied by the pilot symbol. Different pilot symbols of the plurality of pilot symbols can have the same or a different frequency. Among the pilot symbols of the plurality of pilot symbols there can hence be at least one pair of pilot symbols whose frequency difference is maximal with respect to any other pair of pilot symbols taken from the plurality of pilot symbols. Hereinabove, this is the maximal frequency difference between two pilot symbols of the plurality of pilot symbols.

Additionally or alternatively, the input interface 110 can be configured to limit the number of pilot symbols of the plurality of pilot symbols to cause a maximal time difference between respective time slots of two pilot symbols of the plurality of pilot symbols being smaller than 90% (or smaller than 85%) of a coherence time of the communication channel and being larger than 70% (or larger than 75%) of the coherence time. Similarly to explained above, such a limitation of the number of pilot symbols of the plurality of pilot symbols may provide the best tradeoff between channel estimation accuracy and runtime complexity and/or memory footprint. If the input interface 110 is configured to receive measurement data of at least one of a maximal Doppler shift and a maximal delay spread, the input interface 110 may compute the coherence time from this measurement data.

The maximal time difference between respective time slots of two pilot symbols of the plurality of pilot symbols is to be understood as follows: Each pilot symbol can be associated with a time slot which corresponds to the time slot of the radio resource element that is occupied by the pilot symbol. Different pilot symbols of the plurality of pilot symbols can have the same or a different time slot. Among the pilot symbols of the plurality of pilot symbols there can hence be at least one pair of pilot symbols whose time slots have a maximal time difference (e.g., are spaced the furthest apart from each other along the time axis in FIG. 2) with respect to any other pair of pilot symbols taken from the plurality of pilot symbols. Hereinabove, this is the maximal time difference between respective time slots of two pilot symbols of the plurality of pilot symbols.

Moreover, the input interface 110 can be configured to adapt the number of pilot symbols of the plurality of pilot symbols if at least one of the maximal Doppler shift and the maximal delay spread changes by more than 10% (or more than 15%, or more than 20%). This can adapt the proposed channel estimation to changing statistical properties of the communication channel and can hence make channel estimation more reliable over time and less susceptible towards (severely) changing signal propagation conditions. For example, the input interface 110 may continuously (or in predefined time intervals) receive measurement data of the maximal Doppler shift and/or the maximal delay spread and can be configured to compare the latest measurement data with previous measurement data. Once at least one of the maximal Doppler shift and the maximal delay spread shows too high a deviation from previous data, the input interface may adapt the number of pilot symbols of the plurality of pilot symbols and can trigger a regeneration of the channel autocorrelation matrix, the channel cross-correlation vector, the subspace mapping, and the subspace channel estimation filter coefficients. On the other hand, as long as the maximal Doppler shift and/or the maximal delay spread do not show too high a deviation from previous data, the subspace mapping used for transforming incoming pilot symbols into subspace transformed pilot symbols may remain unaltered as well as the subspace channel estimation filter coefficients. Their regeneration can then be avoided, which can save computational resources of the channel estimation circuit 100 as well as electrical power.

Of course, the channel estimation circuit 100 can be configured to estimate more than one channel coefficient associated with a radio resource element of the communication channel. Referring again to FIG. 2, for example, the channel estimation circuit 100 can be configured to generate respective estimates of channel coefficients for multiple of the clear squares 205 (e.g., for multiple radio resource elements that are used for communicating data and are not occupied by a pilot symbol).

To this end, the processing circuitry 120 can be configured to generate a second channel cross-correlation vector by computing correlation coefficients between a second, different channel coefficient that is to be estimated and channel coefficients of radio resource elements that are associated with the plurality of pilot symbols. That is to say, the second channel coefficient is associated with a radio resource element different from (e.g., having a different subcarrier and/or a different time slot as) the radio resource element of the first channel coefficient. Furthermore, the processing circuitry 120 can be configured to generate a second subspace transformed channel cross-correlation vector by applying the subspace mapping to the second channel cross-correlation vector. Furthermore, the processing circuitry 120 can be configured to generate a second plurality of subspace channel estimation coefficients based on the subspace transformed channel autocorrelation matrix and the second subspace transformed channel cross-correlation vector. Furthermore, the processing circuitry 120 can be configured to generate an estimate of the second channel coefficient based on the plurality of subspace transformed pilot symbols and the second plurality of subspace channel estimation coefficients. The output interface 150 can be configured to provide the estimate of the second channel coefficient.

In other words, to generate the estimate of the second channel coefficient, it can be avoided to transform the plurality of pilot symbols another time to the subspace as they have already been transformed in course of the generation of the estimate of the first channel coefficient. The same subspace mapping computed from the channel autocorrelation matrix can be used to subspace transform the second channel cross-correlation vector. This second channel cross-correlation vector can comprise correlation coefficients between the second channel coefficient to be estimated and the channel coefficients of the radio resource elements that are associated with the plurality of pilot symbols. For the subspace transformation of the second channel cross-correlation vector, the subspace mapping can optionally be scaled by the SINR profile (or the SIR profile, or the SNR profile) of the communication channel. The second subspace transformed channel cross-correlation vector can then be used together with the already subspace transformed channel autocorrelation matrix to generate new subspace channel estimation filter coefficients (e.g., the second plurality of subspace channel estimation filter coefficients). The estimate of the second channel coefficient may then be obtained by filtering the already subspace transformed plurality of pilot symbols with the second plurality of subspace channel estimation coefficients.

The (first) plurality of pilot symbols may only cover a certain portion of the communication channel. For example, the communication channel may comprise one or more radio resource elements that are spaced far apart in frequency and/or time from radio resource elements associated with the (first) plurality of pilot symbols, for example, by more than half the coherence bandwidth (or more than the coherence bandwidth, or more than twice the coherence bandwidth)

and/or more than half the coherence time (or more than the coherence time, or more than twice the coherence time), respectively.

To generate estimates of channel coefficients associated with such radio resource elements (e.g., an estimate of a second, different channel coefficient, or an estimate of an (n+1)-th channel coefficient if n (n=1, 2, 3, . . . ) channel coefficients have already been generated), the input interface 110 can be configured to receive at least a second plurality of pilot symbols from the communication channel. Additionally, the processing circuitry 120 can be configured to generate at least a second channel cross-correlation vector by computing correlation coefficients between the second, different channel coefficient that is to be estimated and channel coefficients of radio resource elements that are associated with the second plurality of pilot symbols. Furthermore, the processing circuitry 120 can be configured to generate at least a second subspace transformed channel cross-correlation vector and a second plurality of subspace transformed pilot symbols by applying the subspace mapping to the second channel cross-correlation vector and to the second plurality of pilot symbols. Furthermore, the processing circuitry 120 can be configured to generate a second plurality of subspace channel estimation filter coefficients based on the subspace transformed channel autocorrelation matrix and the second subspace transformed channel cross-correlation vector. Furthermore, the processing circuitry 120 can be configured to generate an estimate of the second channel coefficient based on the second plurality of subspace transformed pilot symbols and the second plurality of subspace channel estimation filter coefficients. The output interface 150 can be configured to provide the estimate of the second channel coefficient.

At least one pilot symbol of the second plurality of pilot symbols may be different from any pilot symbol of the first plurality of pilot symbols in the sense that, at least one radio resource element associated with the second plurality of pilot symbols is different from (e.g., has a different time slot and/or a different frequency as) any radio resource element associated with the first plurality of pilot symbols. In some examples, all pilot symbol of the second plurality of pilot symbols may be different from those of the first plurality of pilot symbols. Optionally, the first and the second plurality of pilot symbols can comprise the same number of pilot symbols.

The second plurality of pilot symbols may be associated with radio resource elements that are closer in frequency or time to the radio resource element of the second channel coefficient than those radio resource elements associated with the first plurality of pilot symbols. Using the second plurality of pilot symbols for estimating the second channel coefficient may hence provide a higher accuracy for the estimation of the second channel coefficient. That is to say, the processing circuitry 120 can be configured to generate the estimate of the second channel coefficient being associated with a radio resource element of the communication channel that is different from the radio resource element associated with the first channel coefficient.

The subspace mapping and the subspace transformed channel autocorrelation matrix as used for estimating the first channel coefficient may be reused for estimating the second channel coefficient because the communication channel may behave statistically similarly (or identically) at the radio resource elements associated with the second plurality of pilot symbols as at the radio resource elements associated with the first plurality of pilot symbols. This can save computational resources of the channel estimation circuit 100 as well as electrical power.

The first plurality of pilot symbols may also be referred to as a first block of pilot symbols (e.g., reference signal samples). The second plurality of pilot symbols may be referred to as a second block of pilot symbols (e.g., reference signal samples). Subspace filtering can hence feature block processing (e.g., intra-block processing) where the post-fast-fourier-transform frequency-time plane (FFT F/T plane as partially shown in FIG. 2) can be partitioned into a number of frequency-time blocks (F/T blocks). Reference signal samples (e.g., pilot symbols) of a block can be transformed to a vector representing that block. Channel estimation filtering may then be performed for all radio resource elements of interest inside the block.

Optionally, each respective plurality of pilot symbols may be scaled differently by a respective SINR-profile associated with the radio resource elements of the respective plurality of pilot symbols when being subspace transformed. For example, there may be less interference at the radio resource elements associated with the first plurality of pilot symbols than at the radio resource elements associated with the second plurality of pilot symbols (or vice versa). Hence, the SINR profiles may be represented by different diagonal matrices with different entries on their main diagonals representing the differing interference situations for the first and the second plurality of pilot symbols. To this end, the input interface 110 can be configured to receive measurement data of a first signal-to-interference-plus-noise power profile of the radio resource elements associated with the first plurality of pilot symbols and a second signal-to-interference-plus-noise power profile of the radio resource elements associated with the second plurality of pilot symbols.

An additionally received second plurality of pilot symbols can also support the estimation of the (first) channel coefficient, which may be associated with a radio resource element that is closer in the frequency-time plane to the radio resource elements associated with the first plurality of pilot symbols than to the radio resource elements associated with the second plurality of pilot symbols. That is to say, the second plurality of pilot symbols may provide information on the communication channel that is still correlated with the radio resource element associated with the (first) channel coefficient.

To this end, the input interface 110 can be configured to receive at least a second plurality of pilot symbols from the communication channel. At least one pilot symbol of the second plurality of pilot symbols may be different from any pilot symbol of the first plurality of pilot symbols. Optionally, the first and the second plurality of pilot symbols can comprise the same number of pilot symbols. Additionally, the processing circuitry 120 can be configured to generate the channel cross-correlation vector by computing correlation coefficients between the channel coefficient to be estimated and channel coefficients of radio resource elements that are associated with the first or the second plurality of pilot symbols. That is to say, the channel cross-correlation vector can be extended by comprising more correlation coefficients, e.g., not only those correlation coefficients between the channel coefficient to be estimated and the channel coefficients of the radio resource elements that are associated with the first plurality of pilot symbols, but additional correlation coefficients between the channel coefficient to be estimated and the channel coefficients of the radio resource elements that are associated with the second plurality of pilot symbols.

Furthermore, the processing circuitry 120 can be configured to generate the channel autocorrelation matrix by computing correlation coefficients between channel coefficients of the radio resource elements that are associated with the first or the second plurality of pilot symbols. The channel autocorrelation matrix can hence also be extended. It does then not only comprise correlation coefficients between the channel coefficients of the radio resource elements that are associated with the first plurality of pilot symbols, but also correlation coefficients between the channel coefficients of the radio resource elements that are associated with the second plurality of pilot symbols, and correlation coefficients between the channel coefficients of the radio resource elements that are associated with the first plurality of pilot symbols and the channel coefficients of the radio resource elements that are associated with the second plurality of pilot symbols.

Subsequently, the processing circuitry 120 can subspace transform the (extended) channel cross-correlation vector and the (extended) channel autocorrelation matrix to generate an (extended) subspace transformed channel cross-correlation vector and an (extended) subspace transformed channel autocorrelation matrix, respectively, by applying the subspace mapping. The subspace mapping may be based on a submatrix of the channel autocorrelation matrix, which can save computational resources and memory footprint of the processing circuitry 120. For example, the submatrix can comprise only those correlation coefficients between channel coefficients of radio resource elements that are associated with the first plurality of pilot symbols. This is possible, for example, when the communication channel behaves statistically similarly (or identically) at the radio resource elements associated with the first plurality of pilot symbols as at the radio resource elements associated with the second plurality of pilot symbols. The subspace mapping may then be generated from an eigendecomposition, a QR decomposition, a Cholesky decomposition, or a singular value decomposition of the submatrix of the channel autocorrelation matrix, for example. Alternatively, the subspace mapping can be based on the extended channel autocorrelation matrix.

Next, the processing circuitry 120 can generate the plurality of subspace channel estimation filter coefficients based on the (extended) subspace transformed channel autocorrelation matrix and the (extended) subspace transformed channel cross-correlation vector. Furthermore, in addition to generating a first plurality of subspace transformed pilot symbols, the processing circuitry 120 can be configured to generate a second plurality of subspace transformed pilot symbols by applying the subspace mapping to the second plurality of pilot symbols. The processing circuitry 120 can then be configured to generate the estimate of the channel coefficient additionally based on the second plurality of subspace transformed pilot symbols. That is to say, the generation of the estimate of the channel coefficient can be based on the subspace channel estimation filter coefficients, the first plurality of subspace transformed pilot symbols, as well as on the second plurality of subspace transformed pilot symbols.

The above described concept can be referred to as interblock processing, where neighboring blocks of subspace transformed pilot symbols (e.g., the first and the second plurality of subspace transformed pilot symbols) can be combined to form an extended plurality (e.g., an extended vector) of subspace transformed pilot symbols, which can then be used to generate one or more channel estimates. Of course, more than two pluralities of pilot symbols can be employed for this purpose.

The channel coefficient (or the channel coefficients) to be estimated when applying interblock processing can be associated with a radio resource element that is close to the radio resource elements associated with the first plurality of pilot symbols. For example, the processing circuitry 120 can be configured to generate the estimate of the channel coefficient being associated with a radio resource element having a frequency that is at most as large as a maximum frequency of the first plurality of pilot symbols and is at least as large as a minimum frequency of the first plurality of pilot symbols. Additionally, the radio resource element associated with the channel coefficient can have a time slot that is to the earliest coincident with the earliest time slot of a pilot symbol of the first plurality of pilot symbols and is to the latest coincident with the latest time slot of a pilot symbol of the first plurality of pilot symbols.

In other words, in the frequency-time plane there can be at least one radio resource element associated with one of the pilot symbols of the first plurality of pilot symbols whose frequency is the highest with respect to the frequencies of the other radio resource elements associated with pilot symbols of the first plurality of pilot symbols. Furthermore, there can be at least one radio resource element associated with another one of the pilot symbols of the first plurality of pilot symbols whose frequency is the lowest with respect to the other radio resource elements associated with pilot symbols of the first plurality of pilot symbols. The frequency of the radio resource element for which a channel coefficient is to be estimated can then range between this lowest frequency and this highest frequency.

Likewise, in the frequency-time plane there can be at least one radio resource element associated with one of the pilot symbols of the first plurality of pilot symbols whose time slot is the earliest with respect to the time slots of the other radio resource elements associated with pilot symbols of the first plurality of pilot symbols. Furthermore, there can be at least one radio resource element associated with another one of the pilot symbols of the first plurality of pilot symbols whose time slot is the latest with respect to the time slots of the other radio resource elements associated with pilot symbols of the first plurality of pilot symbols. The time slot of the radio resource element for which the channel coefficient is to be estimated can then range between this earliest time slot and this latest time slot.

In a nutshell, the radio resource element for which the channel coefficient is to be estimated may lie within a block of the frequency-time plane covered by the first plurality of pilot symbols. This can make the estimation of the channel coefficient(s) more accurate.

For the reception of pilot symbols, there may be a stream of pilot symbols arriving from the communication channel at the input interface 110 during telecommunication. The arriving pilot symbols can be distributed over the frequency-time plane. The input interface 110 can be configured to partition the stream of pilot symbols from the communication channel into the first and at least the second plurality of pilot symbols. In this way, the input interface 110 can group the arriving pilot symbols in blocks (e.g., into the pluralities of pilot symbols) and hence divide the frequency-time plane into different sections covered by different pluralities of pilot symbols.

For example, the input interface 110 can be configured to partition the stream of pilot symbols causing a minimal frequency difference between the first and the second plurality of pilot symbols being at most twice as large (or at most three times as large, or at most five times as large) as a minimal frequency difference between two pilot symbols of the first plurality of pilot symbols. That is to say, the first and the second plurality of pilot symbols may be neighboring each other in frequency direction within the frequency-time plane.

Depending on how the first and the second plurality of pilot symbols are arranged within the frequency-time plane, the minimal frequency difference between the first and the second plurality of pilot symbols can be the frequency difference between the highest frequency occurring among the radio resource elements associated with the first plurality of pilot symbols and the lowest frequency occurring among the radio resource elements associated with the second plurality of pilot symbols. Alternatively, the minimal frequency difference between the first and the second plurality of pilot symbols can be the frequency difference between the lowest frequency occurring among the radio resource elements associated with the first plurality of pilot symbols and the highest frequency occurring among the radio resource elements associated with the second plurality of pilot symbols.

Additionally or alternatively, the input interface 110 can be configured to partition the received stream of pilot symbols causing a minimal time difference between respective time slots of the first and the second plurality of pilot symbols being at most twice as large (or at most three times as large, or at most five times as large) as a minimal time difference between respective time slots of two pilot symbols of the first plurality of pilot symbols. That is to say, the first and the second plurality of pilot symbols may be neighboring each other in time direction within the frequency-time plane.

Analogously to above, depending on how the first and the second plurality of pilot symbols are arranged within the frequency-time plane, the minimal time difference between respective time slots of the first and the second plurality of pilot symbols can be the time difference between the earliest time slot of a radio resource element associated with the first plurality of pilot symbols and the latest time slot of a radio resource element associated with the second plurality of pilot symbols. Alternatively, the minimal time difference between respective time slots of the first and the second plurality of pilot symbols can be the time difference between the latest time slot of a radio resource element associated with the first plurality of pilot symbols and the earliest time slot of a radio resource element associated with the second plurality of pilot symbols.

According to some examples, neighboring pluralities of pilot symbols can be directly neighboring each other. The latest pilot symbol of the first plurality of pilot symbols may then be communicated one time slot prior to the earliest pilot symbol of the second plurality of pilot symbols (or vice versa). Additionally or alternatively, the highest (with respect to frequency) subcarrier(s) associated with the first plurality of pilot symbols may be adjacent to the lowest (with respect to frequency) subcarrier(s) associated with the second plurality of pilot symbols (or vice versa).

In some examples, neighboring pluralities of pilot symbols may be partially overlapping each other in the frequency-time plane.

Alternatively, according to some examples, neighboring pluralities of pilot symbols may be spaced apart from each other in the frequency-time plane, for example, by one or more subcarriers and/or at least half a coherence bandwidth in frequency direction, and/or at least by one or more time slots and/or half a coherence bandwidth in time direction.

If there are more than two neighboring pluralities of pilot symbols, the neighboring pluralities of pilot symbols may be arranged consecutively in time direction and/or in frequency direction in the frequency-time plane. For example, a first plurality of pilot symbols may be followed by a second plurality of pilot symbols in time, and the second plurality of pilot symbols may be followed by a third plurality of pilot symbols in time (or vice versa); or the first plurality of pilot symbols may comprise subcarriers located below (with respect to frequency) subcarriers of the second plurality of pilot symbols, and the second plurality of pilot symbols may comprise subcarriers located below (with respect to frequency) subcarriers of the second plurality of pilot symbols (or vice versa), for example.

Using pluralities of pilot symbols neighboring each other within the frequency-time plane can make the estimation of channel coefficients more accurate when employing inter-block processing.

When employing inter-block processing, two or more pluralities of subspace transformed pilot symbols can be used for the estimation of a channel coefficient. For the estimation of the channel coefficient some of the subspace transformed pilot symbols can be more important (e.g., have a stronger influence on the accuracy of the estimation) than other subspace transformed pilot symbols of the pluralities of subspace transformed pilot symbols. To reduce computational effort of the processing circuitry 120, the processing circuitry 120 can be configured to select certain subspace transformed pilot symbols and to only consider these for the estimation.

That is to say, the processing circuitry 120 can be configured to generate a reduced plurality of subspace transformed pilot symbols by selecting subspace transformed pilot symbols from the first and at least the second plurality of subspace transformed pilot symbols. Furthermore, the processing circuitry 120 can be configured to generate a reduced subspace transformed channel autocorrelation matrix by selecting correlation coefficients from the (extended) subspace transformed channel autocorrelation matrix. Furthermore, the processing circuitry 120 can be configured to generate a reduced subspace transformed channel cross-correlation vector by selecting correlation coefficients from the (extended) subspace transformed channel cross-correlation vector. Furthermore, the processing circuitry 120 can be configured to generate the plurality of subspace channel estimation filter coefficients based on the reduced subspace transformed channel autocorrelation matrix and the reduced subspace transformed channel cross-correlation vector. Optionally, the generation of the subspace channel estimation filter coefficients may be additionally based on the signal-to-noise-and-interference profile (or the SIR profile, or the SNR profile) of the communication channel. Furthermore, the processing circuitry 120 can be configured to generate the estimate of the channel coefficient based on the reduced plurality of subspace transformed pilot symbols and the plurality of subspace channel estimation filter coefficients.

For example, the processing circuitry 120 can be configured to generate the reduced plurality of subspace transformed pilot symbols by selecting all subspace transformed pilot symbols of the first plurality of subspace transformed pilot symbols and selecting those subspace transformed pilot symbols from the second plurality of subspace transformed pilot symbols whose corresponding eigenvalues of the channel autocorrelation matrix are larger than a predefined (second) threshold. Additionally, the processing circuitry 120 can optionally be configured to generate the estimate of the channel coefficient being associated with a radio resource element having a frequency that is at most as large as a maximum frequency of the first plurality of pilot symbols and is at least as large as a minimum frequency of the first plurality of pilot symbols. Additionally, the radio resource element associated with the channel coefficient to be estimated can optionally have a time slot that is to the earliest coincident with the earliest time slot of a pilot symbol of the first plurality of pilot symbols and is to the latest coincident with the latest time slot of a pilot symbol of the first plurality of pilot symbols.

In other words, when the radio resource element for which a channel coefficient is to be estimated falls within the block of the frequency-time plane fenced by the first plurality of pilot symbols, then also all subspace transformed pilot symbols of the first plurality of pilot symbols may be used for estimating the channel coefficient. However, not all subspace transformed pilot symbols of the second plurality of pilot symbols may be employed for this estimation since the radio resource elements associated with the pilot symbols of the second plurality of pilot symbols may be spaced further apart in frequency or time from the radio resource element of the channel coefficient to be estimated.

Transforming a plurality of pilot symbols into the subspace can comprise projecting a vector containing the plurality of pilot symbols onto an eigenvector of the channel autocorrelation matrix, e.g., computing the inner product of the vector containing the plurality of pilot symbols and the eigenvector. This inner product may then represent a subspace transformed pilot symbol. The eigenvalue associated with the eigenvector used for the computation of the inner product can then be the eigenvalue corresponding to the subspace transformed pilot symbol. Other subspace transformed pilot symbols may come from respective inner products of the vector containing the plurality of pilot symbols and other respective eigenvectors of the channel autocorrelation matrix and may hence correspond to other respective eigenvalues associated with those eigenvectors.

As explained above, for the subspace mapping a subspace mapping matrix can be constructed from eigenvectors (of the channel autocorrelation matrix) whose corresponding eigenvalues are larger than a predefined first threshold. This subspace mapping can be applied to transform both the first and at least the second plurality of pilot symbols into the subspace. All subspace transformed pilot symbols of the first plurality of subspace transformed pilot symbols can correspond to eigenvalues being larger than the predefined first threshold and can be used for estimating the channel coefficient. However, regarding the subspace transformed pilot symbols of the second plurality of subspace transformed pilot symbols a stricter choice may be made and only those pilot symbols may be selected for estimating the channel coefficient whose corresponding eigenvalues are larger than a second, higher predefined threshold.

For example, the second predefined threshold may be at least twice as high (or at least three times higher) as the first predefined threshold. For example, the processing circuitry 120 can be configured to set the predefined (second) threshold to larger than 0.2% (or larger than 1%, or larger than 2%) and/or smaller than 20% (or smaller than 4%, or smaller than 2%, or smaller than 1%) of the largest eigenvalue of the channel autocorrelation matrix.

Additionally, the processing circuitry 120 can be configured to generate a selection matrix for selecting the subspace transformed pilot symbols from the first and at least the second plurality of subspace transformed pilot symbols. Furthermore, the processing circuitry 120 can be configured to select the correlation coefficients from the (extended) subspace transformed channel autocorrelation matrix by applying the selection matrix to the (extended) subspace transformed channel autocorrelation matrix (in order to generate the reduced subspace transformed channel autocorrelation matrix). Furthermore, the processing circuitry 120 can be configured to select the correlation coefficients from the (extended) subspace transformed channel cross-correlation vector by applying the selection matrix to the (extended) subspace transformed channel cross-correlation vector (in order to generate the reduced subspace transformed channel cross-correlation vector). The use of the selection matrix can make the selection process more efficient and can hence reduce computational effort of the processing circuitry 120.

The channel estimation circuit 100 can be at least a part of a central processing unit (CPU), of an application specific integrated circuit (ASIC), of a field programmable gate array (FPGA), of a digital signal processor, of a microcontroller, of a complex programmable logic device (CPLD), and the like. The channel estimation circuit 100 may be implemented in hardware and/or in software.

Figure 3:
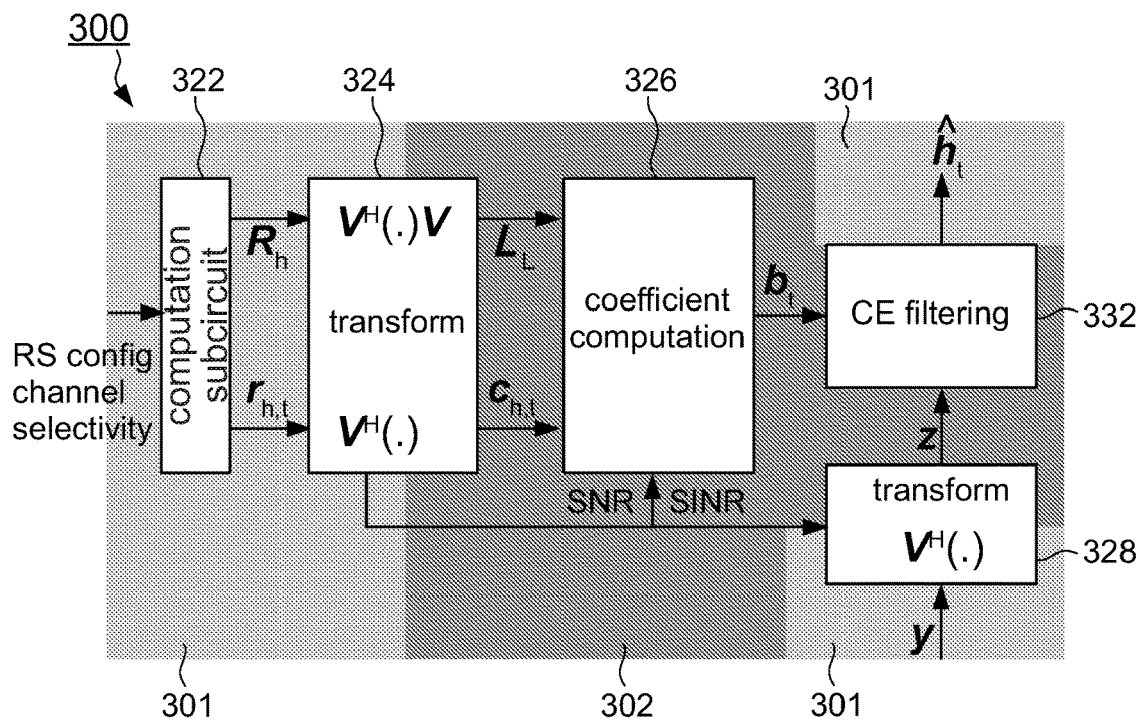
FIG. 3 shows a block diagram of exemplary processing circuitry of a channel estimation circuit.

FIG. 3 shows a block diagram of exemplary processing circuitry 300 of a channel estimation circuit. For example, the processing circuitry 300 can be a possible implementation of the processing circuitry 120 of the channel estimation circuit 100 of FIG. 1.

The block diagram of FIG. 3 illustrates the concept of subspace channel estimation. To this end, the observation space 301 and the subspace 302 are included in the block diagram. By shifting critical computations into the subspace domain 302, the complexity of (channel estimation filter) coefficient synthesis can be reduced. Subsequent channel estimation filtering can also benefit since it is executed in the subspace 302 as well. The estimated channel coefficient(s) $\hat{h}_t$ turn out to be quantities in the observation space 301, so that a dedicated back-transformation into the observation space 301 can be avoided. In this way, a substantial complexity reduction for channel estimation filtering can be achieved.

The processing circuitry 300 comprises a first computation subcircuit 322 configured to receive reference signal configuration data (or pilot symbol configuration data) and/or information on channel selectivity. This can, for instance, comprise predetermined statistical information on the communication channel, measurement data of a maximal Doppler shift and/or a maximal delay spread of the communication channel, measurement data of at least one signal-to-noise or signal-to-interference-plus-noise power profile of a received plurality of pilot symbols, a choice of a channel model to be employed, information on how received pilot symbols are distributed in the frequency-time plane, information on the first and optionally the second threshold for the selection of eigenvalues of the channel autocorrelation matrix, etc.

The first computation subcircuit 322 can be configured to generate a channel autocorrelation matrix $R_h$ of the communication channel. For example, the first computation subcircuit 322 can generate the channel autocorrelation matrix $R_h$ by computing correlation coefficients between channel coefficients of radio resource elements of the communication channel that are associated with a received plurality of pilot symbols. The received plurality of pilot symbols can be written as a vector y (e.g., a column vector). If the received plurality of pilot symbols comprises a number of say N (N=1, 2, 3, . . . ) pilot symbols, the vector y can be element of an N-dimensional complex number space $\mathbb{C}^N$. The channel coefficients whose radio resource elements are associated with the received plurality y of pilot symbols can be written as a vector h (e.g., a column vector). Since the vector h can comprise a channel coefficient for each radio resource element associated with one of the N pilot symbols, the vector h can also be element of the N-dimensional complex number space $\mathbb{C}^N$. The channel autocorrelation matrix $R_h$ can then be expressed by Equation 1.1:

$$R_h = E\{hh^H\},$$

where E{ } is the expectation operator and the superscript H is the hermitian operator. Consequently, the channel autocorrelation matrix $R_h$ can be element of an N×N-dimensional complex number space $\mathbb{C}^{N \times N}$.

As the communication channel can be noisy and/or can be subjected to interference, the first computation subcircuit 322 might not be able to directly generate the channel autocorrelation matrix $R_h$ according to Equation 1.1, but may rather determine a superposition of the channel autocorrelation matrix $R_h$ and an interference and/or noise correlation matrix $R_n$ of the communication channel. The interference and/or noise correlation matrix $R_n$ can be expressed by Equation 1.2:

$$R_h = \{nn^H\},$$

where n is a vector (e.g., a column vector) from $\mathbb{C}^N$ that represents noise and/or interference at the radio resource elements associated with the received plurality y of pilot symbols. $R_n$ can be element of $\mathbb{C}^{N \times N}$.

Additionally, the first computation subcircuit 322 can be configured to generate a channel cross-correlation vector $r_{h,t}$ by computing correlation coefficients between the channel coefficient to be estimated and channel coefficients of radio resource elements of the communication channel that are associated with the plurality y of pilot symbols. Of course, the channel estimation circuit 100 can be configured to estimate more than one channel coefficient of the communication channel. The first computation subcircuit 322 can then be configured to generate a respective channel cross-correlation vector $r_{h,t}$ for each channel coefficient to be estimated. The index t stands for target and designates a (particular) radio resource element in the frequency-time plane whose channel coefficient is to be estimated. Radio resource elements for which channel coefficients are to be estimated may thus also be referred to as targeted radio resource elements. A channel cross-correlation vector $r_{h,t}$ can be expressed by Equation 1.3:

$$r_{h,t} = E\{hh_t^*\},$$

where $h_t$ is the channel coefficient of a targeted radio resource element. Since there are N channel coefficients each associated with one of the N radio resource elements of the N pilot symbols, the channel cross-correlation vector $r_{h,t}$ can be element of $\mathbb{C}^N$. The channel coefficient $h_t$ can be a complex valued scalar. The superscript * denotes the complex-conjugate-operator. If channel coefficients for multiple radio resource elements are to be estimated, multiple corresponding channel cross-correlation vectors may be generated (e.g., computed) by the first computation subcircuit 322.

As explained in context of FIG. 1, the generation of the channel autocorrelation matrix $R_h$ and/or of the channel cross-correlation vector(s) $r_{h,t}$ does not necessarily require the first computation subcircuit 322 to have knowledge of the channel coefficients of the radio resource elements that are associated with the plurality of pilot symbols. The first computation subcircuit 322 may generate the channel autocorrelation matrix $R_h$ and/or the channel cross-correlation vector(s) $r_{h,t}$ based on predetermined statistical information on the communication channel, for example, from a channel model together with assumed and/or measured information on a maximal Doppler shift and/or a maximal delay spread of the communication channel.

Additionally, the processing circuitry 300 comprises a first transformation subcircuit 324. The first computation subcircuit 322 can be configured to provide the channel autocorrelation matrix $R_h$ and the one or more channel cross-correlation vectors $r_{h,t}$ to the first transformation subcircuit 324. The first transformation subcircuit 324 can be configured to generate a subspace mapping for a subspace transformation from the observation space 301 to the subspace 302 based on the channel autocorrelation matrix $R_h$. For example, the first transformation subcircuit 324 can be configured to generate a subspace mapping matrix V by computing an eigendecomposition, a QR-decomposition, a Cholesky-decomposition, and/or a singular value decomposition of the channel autocorrelation matrix $R_h$ and by a rank reduction of $R_h$. The subspace mapping matrix V can comprise a number of L (L<N) vectors $v_1$ to $v_L$ (e.g., column vectors), be written as $V = [v_1 \ldots v_L]$, and be element of an N×L-dimensional complex number space $\mathbb{C}^{N \times L}$.

For eigendecomposition, the first transformation subcircuit 324 can be configured to compute the eigenvalues of the channel autocorrelation matrix $R_h$. One of these eigenvalues can be maximal with respect to the other eigenvalues. The first transformation subcircuit 324 can then set a predefined first threshold to a certain fraction of the maximal eigenvalue and sort out all eigenvalues that are below this predefined threshold. Afterwards, only L eigenvalues of N maximally possible eigenvalues can be left over. Alternatively, the transformation subcircuit 324 may select the L largest eigenvalues, where L may be a predetermined operating parameter of the first transformation subcircuit 324. The first transformation subcircuit 324 can then compute L eigenvectors $v_1$ to $v_L$, of the channel autocorrelation matrix $R_h$ corresponding to the selected L eigenvalues and arrange these eigenvectors in the subspace mapping matrix V. A rank reduced version of the channel autocorrelation matrix $R_h$ is then equal to $V\Lambda_L V^H$ or $R_h \cong V\Lambda_L V^H$, where $\Lambda_L$ is a diagonal eigenvalue matrix from $\mathbb{C}^{L \times L}$ comprising the selected L eigenvalues of the channel autocorrelation matrix $R_h$. This eigenvalue matrix $\Lambda_L$ can correspond to (e.g., be) a subspace transformed channel autocorrelation matrix.

For a QR-decomposition, the channel autocorrelation matrix $R_h$ may be approximately expressed by $R_h \cong VU$. V can be a unitary matrix from $\mathbb{C}^{N \times L}$ and U an upper triangular matrix reduced to $\mathbb{C}^{L \times N}$. The matrix V may then be used as the subspace mapping matrix.

In the case of selective interference, the first transformation subcircuit 324 can optionally scale the subspace mapping matrix by an SINR profile of the communication channel. The SINR profile of the communication channel can be expressed by a diagonal matrix $\Gamma = \text{diag}(\gamma_1 \ldots \gamma_N)$ whose N diagonal elements $\gamma_1$ to $\gamma_N$ can correspond to respective signal-to-interference-plus-noise ratios at the respective radio resource elements associated with the plurality y of pilot symbols. The subspace mapping matrix may then be the matrix product $\Gamma V$.

The first transformation subcircuit 324 can further be configured to generate a subspace transformed channel autocorrelation matrix $\Lambda_L$ and a subspace transformed channel cross-correlation vector $c_{h,t}$ (e.g., one or more subspace transformed channel cross-correlation vectors depending on the number of channel coefficients to be estimated) by applying the subspace mapping to the channel autocorrelation matrix $R_h$ and to the (one or more) channel cross-correlation vector(s) $r_{h,t}$, respectively.

For example, the first transformation subcircuit 324 can be configured to multiply the channel autocorrelation matrix $R_h$ from the left with the Hermitian transpose $V^H$ of the subspace mapping matrix and to multiply $R_h$ from the right with the subspace mapping matrix V to generate the subspace transformed channel autocorrelation matrix $\Lambda_L$. This can be expressed by Equation 2.1:

$$\Lambda_L = V^H R_h V.$$

In this way, the subspace transformed channel autocorrelation matrix $\Lambda_L$ can be element of an L×L complex number space $\mathbb{C}^L$ and be rank reduced with respect to the channel autocorrelation matrix $R_h$ of the observation space 301. Alternatively, the first transformation subcircuit 324 can be configured to generate the subspace transformed channel autocorrelation matrix $\Lambda_L$ by arranging L eigenvalues in a diagonal L×L matrix after having computed and selected the L eigenvalues of the channel autocorrelation matrix $R_h$, for example.

To generate the (one or more) subspace transformed channel cross-correlation vector(s) $c_{h,t}$, the first transformation subcircuit 324 can be configured to multiply the channel cross-correlation vector(s) $r_{h,t}$ from the left with the Hermitian transpose $V^H$ of the subspace mapping matrix, for example, as expressed by Equation 2.2:

$$c_{h,t} = V^H r_{h,t}.$$

The subspace transformed channel cross-correlation vector(s) $c_{h,t}$ can be elements of an L-dimensional complex number space $\mathbb{C}^L$ and can thus be shorter than their corresponding channel cross-correlation vector(s) $r_{h,t}$ of the observation space 301.

The first transformation subcircuit 324 can further be configured to provide the subspace mapping to a second transformation subcircuit 328 of the processing circuitry 300. The second transformation subcircuit 328 can be configured to receive the plurality y of pilot symbols and to generate a plurality z of subspace transformed pilot symbols by applying the subspace mapping to the plurality y of pilot symbols as expressed by Equation 2.3:

$$z = V^H y.$$

In other words, the plurality of subspace transformed pilot symbols can be arranged in a vector (e.g., a column vector) z from the L-dimensional complex number space $\mathbb{C}^L$.

In addition, the processing circuitry 300 comprises a second computation subcircuit 326. The first transformation subcircuit 324 can be configured to provide the subspace transformed channel autocorrelation matrix $\Lambda_L$, the subspace transformed channel cross-correlation vector(s) $c_{h,t}$, and optionally at least one SINR profile (and/or at least one SNR profile) of the communication channel to the second computation subcircuit 326. Furthermore, the first transformation subcircuit 324 can be configured to optionally provide the SINR profile (and/or the SNR profile) to the second transformation subcircuit 328.

The second computation subcircuit 326 can be configured to generate a plurality $b_t$ of subspace channel estimation filter coefficients based on the subspace transformed channel autocorrelation matrix $\Lambda_L$ and the subspace transformed channel cross-correlation vector $c_{h,t}$. If there is more than one subspace transformed channel cross-correlation vector $c_{h,t}$ in order to estimate channel coefficients at various targeted radio resource elements, the second computation subcircuit 326 may generate respective pluralities $b_t$ of subspace channel estimation filter coefficients for each subspace transformed channel cross-correlation vector $c_{h,t}$.

For example, the second computation subcircuit 326 may compute the plurality $b_t$ of subspace channel estimation filter coefficients by adding an L×L sized identity matrix scaled by a noise power of the communication channel to the subspace transformed channel autocorrelation matrix $\Lambda_L$ and multiplying the inverse matrix of this sum of matrices with the respective subspace transformed channel cross-correlation vector $c_{h,t}$ from the right. This is expressed by Equation 3.1:

$$b_t = (\Lambda_L + \sigma^2 I_L)^{-1} c_{h,t},$$

where $\sigma^2$ represents the noise power of the communication channel. In case the noise of the communication channel is colored noise, $\sigma^2 I_L$ may be replaced by a diagonal matrix of L diagonal entries representing the colored noise of the communication channel.

According to some examples, for computing the plurality $b_t$ of subspace channel estimation filter coefficients according to Equation 3.1 rather a system of equations $(\Lambda_L + \sigma^2 I_L) b_t = c_{h,t}$ may be solved than computing the inverse matrix $(\Lambda_L + \sigma^2 I_L)^{-1}$.

The processing circuitry 300 further comprises a subspace channel estimation filter subcircuit 332. The second computation subcircuit 326 can be configured to provide the plurality $b_t$ of subspace channel estimation filter coefficients to the subspace channel estimation filter subcircuit 332. Furthermore, the second transformation subcircuit 328 can be configured to provide the plurality z of subspace transformed pilot symbols to the subspace channel estimation filter subcircuit 332.

The subspace channel estimation filter subcircuit 332 can be configured to generate an estimate of at least one channel coefficient of the communication channel based on the plurality z of subspace transformed pilot symbols and the plurality $b_t$ of subspace channel estimation filter coefficients. For example, the subspace channel estimation filter subcircuit 332 can be configured to filter the plurality z of subspace transformed pilot symbols with the plurality $b_t$ of subspace channel estimation filter coefficients according to Equation 3.2:

$$\hat{h}_t = b_t^H z.$$

Equation 3.2 may be evaluated with respective pluralities $b_t$ of subspace channel estimation filter coefficients corresponding to respective targeted radio resource elements when more than one channel coefficient is to be estimated.

Hence, coefficient computing (according to Equation 3.1) and subspace filtering (according to Equation 3.2) can all be done in the low-dimension subspace. This can reduce computational effort of the processing circuitry 300 and/or memory footprint.

The processing circuitry 300 can further be configured for block processing as already described in context of FIG. 1. Herein, the entire post-FFT F/T plane (subcarriers k, OFDM symbols l) can be partitioned into a number of F/T blocks b, and reference signal samples (or pilot symbol samples) $y_b$ of a block can be transformed to a vector $z_b$ representing that block. Channel estimation filtering may then be performed for all radio resource elements of interest inside the block. Hence Equation 2.3 can be adapted to Equation 4.1 that describes a block transform:

$$z_b = V_H y_b.$$

Likewise, Equation 3.2 can be adapted to Equation 4.2:

$$\hat{h}_t = b_t^H z_b,$$

which expresses intra-block filtering. By virtue of block processing, transformed blocks $z_b$ (L-dim) can be more compact versions of the original reference signal (e.g., a plurality of pilot symbols) sample vectors $y_b$ (N-dim). Hence, storing the set of vectors $z_b$ for a total of $N_b$ blocks (entire F/T plane used for channel estimation) can require less memory ($N_b \cdot L$ samples) than storing all $N_b \cdot N$ respective reference signal samples. The memory footprint can thus be reduced to a fraction L/N (per F/T dimension) of its original size. This can be also useful for large bandwidths (carrier aggregation) and/or high MIMO dimensions (Tx antenna ports, Rx antennas).

Additionally, the processing circuitry 300 can optionally be configured for inter-block processing as described in context of FIG. 1. Herein, B neighboring blocks $\{z_{b1}, \ldots, z_{bB}\}$ can be combined to form extended vectors $\bar{z}_b$ ($\bar{L}$-dim) which can then be used to generate channel estimates. This inter-block combining can be expressed by Equation 4.3:

$$\bar{z}_b = S^H \begin{bmatrix} z_{b1} \\ \vdots \\ z_{bB} \end{bmatrix}.$$

In other words, each of the blocks $\{z_{b1}, \ldots, z_{bB}\}$ can represent a respective plurality of subspace transformed pilot symbols. For example, $z_{b1}$ can represent a first plurality of subspace transformed pilot symbols, $z_{b2}$ can represent a second plurality of subspace transformed pilot symbols and so on, as explained in context of FIG. 1. An extended plurality of subspace transformed pilot symbols can be the stacked vector $[z_{b1}^T \ldots z_{bB}^T]^T$. In Equation 4.3 the optional selection matrix S can be employed to reduce this extended plurality of subspace transformed pilot symbols to generate a reduced plurality of subspace transformed pilot symbols. That is to say, when S is the identity matrix, $\bar{z}_b$ can represent an extended plurality of subspace transformed pilot symbols, otherwise $\bar{z}_b$ can represent a reduced plurality of subspace transformed pilot symbols (reduced with respect to the extended plurality of subspace transformed pilot symbols). Hence, the selection matrix S can perform an optional compression of the stacked vector $[z_{b1}^T \ldots z_{bB}^T]^T$ to $\bar{L}$-dim ($\bar{L} \leq BL$).

Inter-block filtering (e.g., inter-block subspace channel estimation filtering) can then be expressed by Equation 4.4:

$$\hat{h}_t = \bar{b}_t^H \bar{z}_b,$$

which is an adaption of Equation 4.2. The vector $\bar{b}_t$ can represent a plurality of subspace channel estimation filter coefficients based on an extended subspace transformed channel autocorrelation matrix and an extended subspace transformed channel cross-correlation vector (in case the selection matrix S is the identity matrix). Otherwise, the vector $\bar{b}_t$ can represent a plurality of subspace channel estimation filter coefficients based on a reduced subspace transformed channel autocorrelation matrix and a reduced subspace transformed channel cross-correlation vector (as explained in context of FIG. 1).

Optionally, the processing circuitry 300 (and/or an input interface connected to it) can be configured for block size adaption. Subspace filtering may then be combined with a variable F/T block size (e.g., a variable number of pilot symbols of a plurality (e.g., a vector) of pilot symbols). The block size can be adapted to the prevalent channel F/T selectivity, for example.

Subspace channel estimation, comprising block transform $z_b = V^H y_b$ (Equation 4.1), interblock combining $\bar{z}_b = S^H [z_{b1}^T \ldots z_{bB}^T]^T$ (Equation 4.3), and inter-block subspace channel estimation filtering $\hat{h}_t = \bar{b}_t^H \bar{z}_b$ (Equation 4.4), can be expanded as:

$$\bar{z}_b = S^H \begin{bmatrix} z_{b1} \\ \vdots \\ z_{bB} \end{bmatrix} = \Phi^H y_b \quad \text{Equation 5a}$$

with $\Phi = \bar{V} S$;

$$S = \begin{bmatrix} S_1 & & \\ & \ddots & \\ & & S_B \end{bmatrix}, \bar{V} = \begin{bmatrix} V & & \\ & \ddots & \\ & & V \end{bmatrix}, \quad \text{Equation 5b}$$

$$y_b = \begin{bmatrix} y_{b1} \\ \vdots \\ y_{bB} \end{bmatrix};$$

$$\hat{h}_t = \bar{b}_t^H \bar{z}_b = (\Phi \bar{b}_t)^H y_b = \bar{w}_t^H y_b \quad \text{Equation 5c}$$

with $\bar{w}_t = \Phi \bar{b}_t$.

Equation 5a and 5b express that the same subspace mapping matrix V can be used to transform each of the pluralities (or blocks) of pilot symbols $\{y_{b1}, \ldots, y_{bB}\}$ into the subspace 302. This can save computational effort of the processing circuitry 300.

The selection submatrices $S_1$ to $S_B$ of the selection matrix S can be used for selecting (particular) subspace transformed pilot symbols from the pluralities (e.g., blocks) of subspace transformed pilot symbols $\{z_{b1}, \ldots, z_{bB}\}$. For example, when the targeted radio resource element falls within the block of the frequency-time plane fenced by the first plurality $y_{b1}$ of pilot symbols, then also all subspace transformed pilot symbols of the first plurality $z_{b1}$ of pilot symbols may be used for estimating the channel coefficient of the targeted radio resource element. In this case, $S_1$ can be an L×L identity matrix. However, not all subspace transformed pilot symbols of the second plurality $z_{b2}$ to B-th plurality $z_{bB}$ of subspace transformed pilot symbols may be employed for this estimation because the radio resource elements associated with the pilot symbols of the second to B-th plurality of pilot symbols may be spaced further apart in frequency or time from the targeted radio resource element. The selection submatrices $S_2$ to $S_B$ may hence comprise ones and zeros on their main diagonal, for example, in order to only select certain pilot symbols from $z_{b2}$ to $z_{bB}$. For example, only those pilot symbols from $z_{b2}$ to $z_{bB}$ may be selected whose corresponding eigenvalues of the channel autocorrelation matrix are larger than a predefined (second) threshold. Of course, if the targeted radio resource element falls within another block of the frequency-time plane fenced by another plurality of pilot symbols, the selection submatrices $S_1$ to $S_B$ may be adapted to select suitable pilot symbols from the pluralities of subspace transformed pilot symbols $\{z_{b1}, \ldots, z_{bB}\}$.

By virtue of the $\bar{N} \times \bar{L}$ dimensional transform matrix $\Phi = \bar{V}S$ (Equation 5a), the channel autocorrelation matrix $R_h$ and the channel cross-correlation vector $r_{h,t}$ can be transformed into subspace domain 302 by:

$$\overline{\Lambda}_h = \Phi^H R_h \Phi =$$ Equation 6a $$S^H \overline{V}^H \begin{bmatrix} R_{h11} & \cdots & R_{h1B} \\ \vdots & \ddots & \vdots \\ R_{hB1} & \cdots & R_{hBB} \end{bmatrix} \overline{V} S = S^H \begin{bmatrix} \Lambda_{h11} & \cdots & \Lambda_{h1B} \\ \vdots & \ddots & \vdots \\ \Lambda_{hB1} & \cdots & \Lambda_{hBB} \end{bmatrix} S$$

$$\overline{\Lambda}_h = S^H \Lambda_h S$$

$$\overline{c}_{h,t} = \Phi^H r_{h,t} = S^H \overline{V}^H \begin{bmatrix} r_{h1,t} \\ \vdots \\ r_{hB,t} \end{bmatrix} = S^H \begin{bmatrix} c_{h1,t} \\ \vdots \\ c_{hB,t} \end{bmatrix} = S^H c_{h,t}$$ Equation 6b with transformed submatrices $\Lambda_{hij} = V^H R_{hij} V$ (L×L, diagonal for i=j), subvectors $c_{hi,t} = V^H r_{hi,t}$ (L-dimensional), and the optional submatrices $S_i$ condensing $\Lambda_{hij}$ and $c_{hi,t}$, thus reducing the rank of $\overline{\Lambda}_h$ and $\overline{c}_{h,t}$ to $\overline{L} < BL$.

The matrix $R_h$ from Equation 6a comprising the submatrices $R_{hij}$ (i=1, 2, ..., B; j=1, 2, ..., B) can represent an extended channel autocorrelation matrix. This extended channel autocorrelation matrix does not only comprise correlation coefficients between channel coefficients of the radio resource elements that are associated with one plurality of pilot symbols (e.g., the first plurality of pilot symbols $y_{b1}$ as expressed by $R_{h11}$). It also comprises correlation coefficients between the channel coefficients of the radio resource elements that are associated with the second to B-th plurality of pilot symbols (as expressed by $R_{h22}$ to $R_{hBB}$). Furthermore, the extended channel autocorrelation matrix also comprises correlation coefficients between channel coefficients of the radio resource elements that are associated with different pluralities of pilot symbols (e.g., those $R_{hij}$ for which i≠j). After subspace transformation of the extended channel autocorrelation matrix $R_h$ by virtue of the subspace mapping matrix V to generate the extended subspace transformed channel autocorrelation matrix $\Lambda_h$, $\Lambda_h$ may be reduced to the reduced subspace transformed channel autocorrelation matrix $\overline{\Lambda}_h$ by application of the selection matrix S.

The vector $\overline{c}_{h,t}$ can represent an extended subspace transformed channel cross-correlation vector that can be identical to the stacked vector $[c_{h,1,t}^T \ldots c_{hB,t}^T]^T$ of subspace transformed cross-correlation vectors if the selection matrix S is the identity matrix. Otherwise, $\overline{c}_{h,t}$ can represent a reduced subspace transformed channel cross-correlation vector.

Subspace coefficients $\overline{b}_t$ (e.g., one or more pluralities of subspace channel estimation filter coefficients for estimating one or more channel coefficients, respectively) can be given by:

$$\overline{b}_t = (\overline{\Lambda}_L + \sigma^2 I_{\overline{L}})^{-1} \overline{c}_{h,t}$$ Equation 7a:

where $I_{\overline{L}}$ is a $\overline{L} \times \overline{L}$ dimensional identity matrix and $\sigma^2$ represents the noise power of the communication channel.

A corresponding mean square error (MSE) $\overline{\xi}_t$ can be computed by:

$$\overline{\xi}_t = 1 - \overline{c}_{h,t}^H \overline{b}_t.$$ Equation 7b:

Hence, coefficient computation (according to Equation 7a) and subspace filtering $\hat{h}_t = \overline{b}_t^H \overline{z}_b$ (according to Equation 5c) can be done in the low-dimension subspace 302. For example, 6- or 4-dim matrix operations can suffice to accomplish filtering with effective filter lengths $\overline{N} = BN = 8$, 16, 32, or more.

With the proposed concept of subspace channel estimation, a coefficient memory for storing the plurality (or pluralities) of subspace channel estimation filter coefficients $\overline{b}_t$ can be reduced with respect to channel estimation circuits performing channel estimation filtering in the observation space. That is to say, the set of subspace filters $\{\overline{b}_t\}$ needed to serve all T targeted radio resource elements of a block can require less memory (T·$\overline{L}$ vs T·N coefficients) than storing a set of filters $\{\overline{w}_t\}$ needed for channel estimation filtering in the observation space.

Furthermore with the proposed concept of subspace channel estimation, there can be an inter-block filtering gain. By using information contained in multiple blocks, the filter length can effectively be increased to $\overline{N} = BN$ whereby estimation performance can be lifted to a level comparable to that of other filtering techniques. For example, this can be used for small blocks and targeted radio resource elements at the block edges. Although block vectors $z_b$ (Equation 4.1) by themselves might not be a sufficient statistic, they can represent the block in the sense that, when combined with neighboring blocks (Equation 4.3 and/or Equation 5a), channel estimation performance (Equation 4.4 and/or Equation 5c) can approach optimality.

Moreover, a long filtering gain may be reached by virtue of the proposed concept. Increasing the block length N via block size adaptation can yield longer effective filters and thus additional gain. Channel estimation filtering performance thus realized may significantly exceed that of other filtering techniques.

Additionally, performance may be improved in terms of processing effort and/or power consumption. For example, executing channel estimation filtering according to Equation 4.4 and/or Equation 5c multiple times per block (all T targeted radio resource elements) can achieve saving that may outweigh the effort for the observation transform (Equation 4.1) due to shorter subspace filtering (length-$\overline{L}$ filter $\overline{b}_t$ vs length-N filter $\overline{w}_t$ in the observation space).

Furthermore, the block processing rate may be reduced. Increasing the block length N via block size adaptation can reduce the number $N_b$ of blocks in a given F/T plane. Hence, fewer block transforms (Equation 4.1) and block combining operations (Equation 4.3 and/or Equation 5a) can be executed per unit time.

Figure 4A:
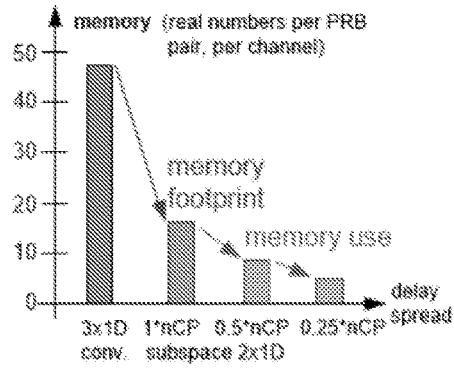
FIGS. 4a-b illustrate memory requirement and number of multiply-and-add operations for subspace 2×1D channel estimation.
Figure 4B:
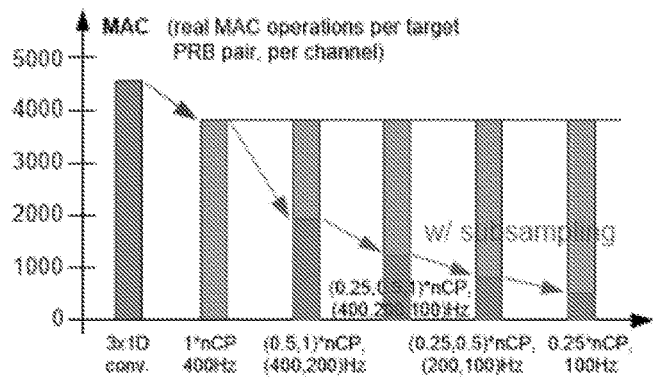

FIGS. 4a-b illustrate the (computational) complexity for an example of Long-Term Evolution (LTE) subspace 2×1D filtering in terms of memory requirement (FIG. 4a) and multiply-and-add (MAC) operations (FIG. 4b), all per physical resource block (PRB) pair and Tx/Rx channel, for delay spreads [1, 0.5, 0.25]·nCP (cyclic prefix), Doppler spreads ~[400, 200, 100] Hz, block lengths 0.8·$L_{coh}$=[12, 24, 36] ($N_f$, $N_t \in$[4, 8, 16] reference signal samples or [1, 2, 4] PRB pairs), 3×2-block F/T filtering, inter-block lengths $\overline{N}_f = 3N_f$, $\overline{N}_t = 2N_t$, rank L=2, and subspace filter length $\overline{L}_f$=6, $\overline{L}_t$=4.

FIG. 4a shows that the 2×1D subspace filtering memory footprint is only about one third of that of 3×1D filtering applied in the observation space (fairly optimized part of conventional modems). The memory actually used can be further reduced depending on the block size in frequency direction (governed by the delay spread). FIG. 4b shows that about 15% of the MAC operations can be saved. Increasing the effective filter length (here from 48 to 768 reference signal samples) for the sake of higher channel estimation gain does not cost additional processing power. As the effort of channel estimation filtering (Equation 4.4 and/or Equation 5c) may be dominant (not the effort of the block transform from Equation 4.1), significant savings can be realized through channel subsampling (e.g., by a coarser grid of the targeted radio resource elements).

Figure 5A:
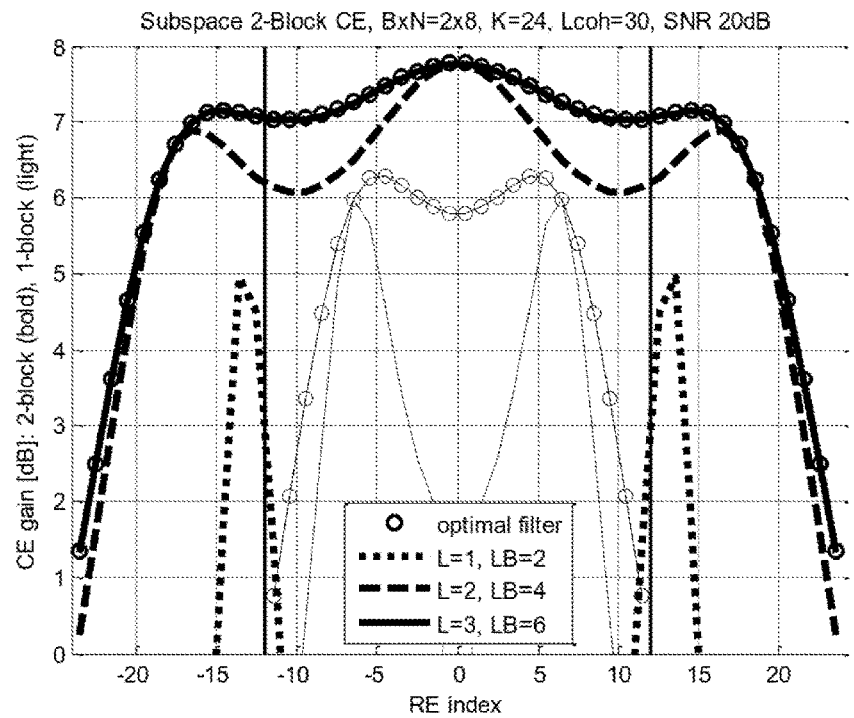
FIGS. 5a-b show performance plots of 1D subspace channel estimation.
Figure 5B:
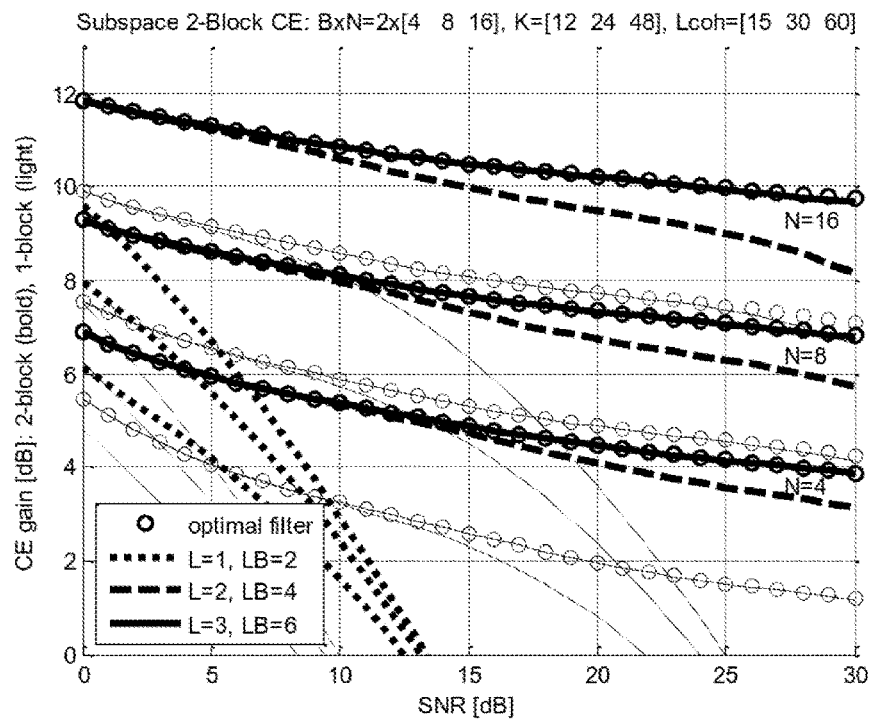

FIGS. 5a-b display the performance achieved with 1D subspace channel estimation filtering (configured as in the example of FIG. 4-b). FIG. 5a shows the mean square error (MSE) versus the radio resource element (RE) index for 2×8 filtering. FIG. 5b shows the MSE versus the signal-to-noise ratio for 2×[4, 8, 16] filtering matched to channel coherence. In contrast to intra-block filtering (according to Equation 4.2, dotted curves), inter-block filtering (according to Equation 4.4 and/or to Equation 5c, solid curve) can yield near-optimal performance (circled curves) already for low subspace orders L between 2 and 3, depending on the channel selectivity (e.g., the coherence bandwidth $L_{coh}$ and the signal-to-noise ratio). For FIG. 5a the signal-to-noise ratio is 20 dB. As shown in FIG. 5b, increased block lengths (e.g., increased N) can directly translate into substantially higher channel estimation gain already for 1D filtering.

Figure 6A:
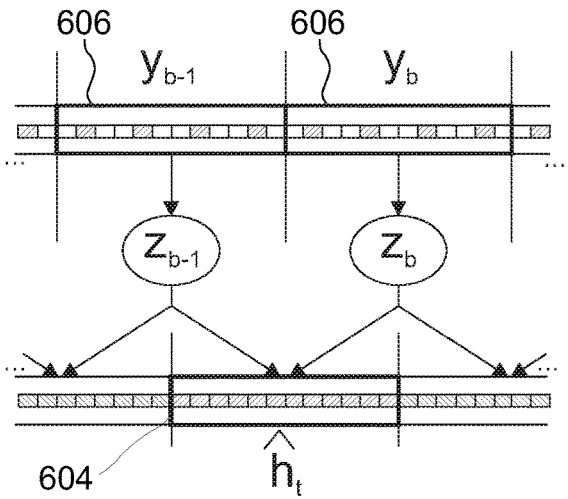
FIGS. 6a-c illustrate examples of subspace channel estimation filtering in the frequency-time plane.
Figure 6B:
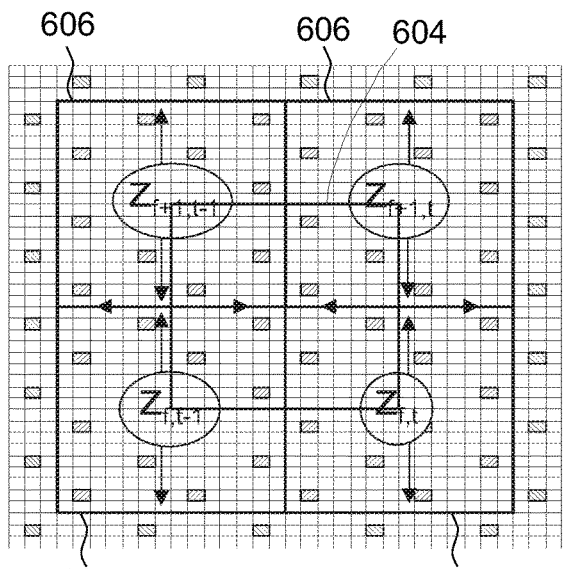
Figure 6C:
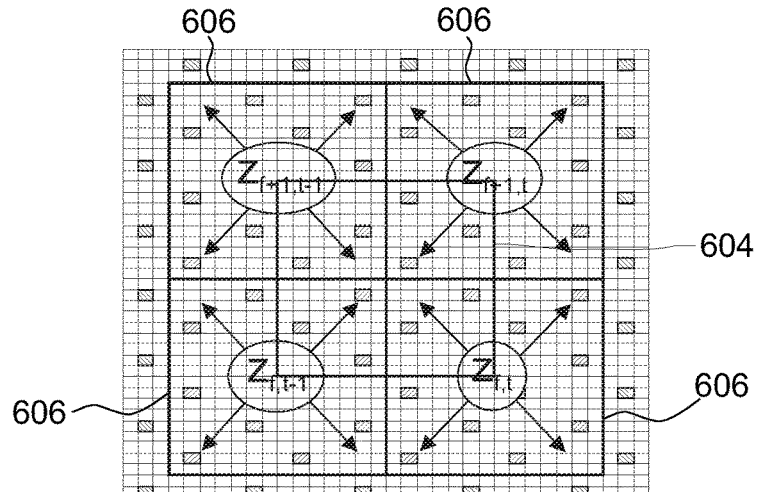

FIGS. 6a-c illustrate subspace block combining (Equation 4.3 and/or Equation 5a) and interblock channel estimation filtering (Equation 4.4 and/or Equation 5c) for 1D 2-block (FIG. 6a), 2×1D 2×2-block (FIG. 6b), and 2D 4-block filtering (FIG. 6c), respectively. The positions of target regions 604 in this case are different from those of the observation blocks 606.

According to some examples of the present disclosure, subspace filtering may be based on any subspace generation technique, e.g., eigenanalysis $R_h = V_h \Lambda_h V_h^H$, QR-decomposition $R_h = V_h U_h$, or Cholesky decomposition $R_h = L_h [D_h] L_h^H$. Furthermore, subspace filtering may optionally be combined with subspace interference mitigation. Furthermore, subspace filtering may optionally be combined with channel subsampling. Furthermore, subspace filtering in two dimensions may be realized as staggered 2×1D filtering in any order.

Optionally, F/T block sizes can match a sweet spot (about 80% of the coherence length, ~0.8·$L_{coh}$), but may also be smaller. F/T blocks may or might not correspond with LTE PRB or multiples thereof. Optionally, the channel statistics (channel autocorrelation matrix $R_h$, channel cross-correlation vector $r_{h,t}$) used in subspace generation may be based on any channel profile, e.g., a prototype (rect, Jakes, exponential) or measured delay/Doppler profiles.

Furthermore, all parts of subspace channel estimation may be activated on demand. For example, coefficient computation (according to Equation 7a) can be triggered by a channel parameter change, block transform (according to Equation 4.1) only for blocks used in interblock combining (according to Equation 4.3 and/or Equation 5a), and channel estimation filtering (according to Equation 4.4 and/or Equation 5c) only for radio resource elements requiring a channel estimate.

Figure 7:
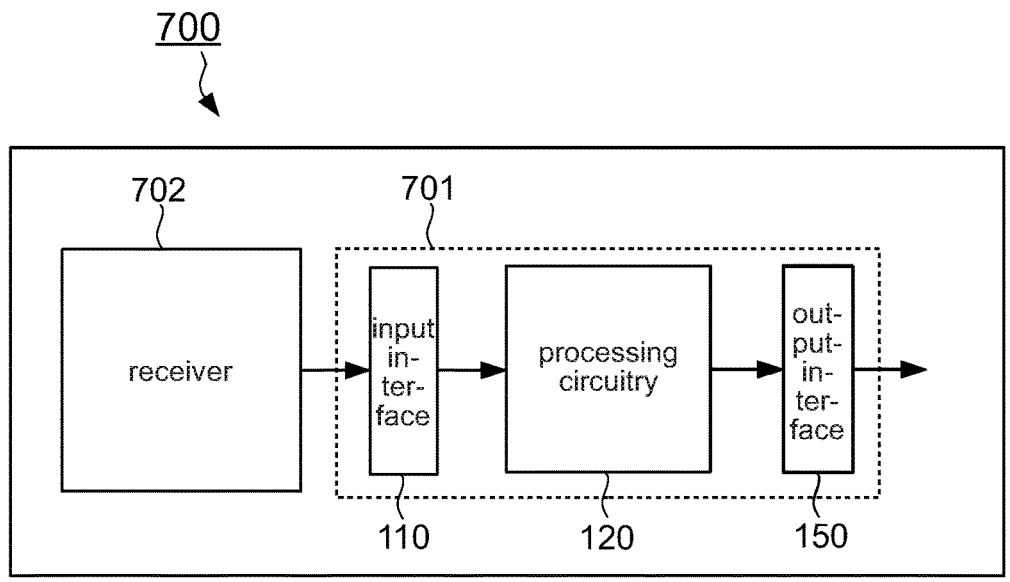
FIG. 7 shows a block diagram of a telecommunication device.

FIG. 7 shows a block diagram of a telecommunication device 700. The telecommunication device 700 comprises a channel estimation circuit 701. The channel estimation circuit 701 comprises an input interface 110. The input interface 110 is configured to receive a plurality of pilot symbols from a communication channel. Furthermore, the channel estimation circuit 701 comprises processing circuitry 120. The processing circuitry 120 is configured to generate a channel autocorrelation matrix and at least one channel cross-correlation vector. The generating of the channel autocorrelation matrix and the channel cross-correlation vector can be based on predetermined statistical information on the communication channel. Additionally, the processing circuitry 120 is configured to generate a subspace mapping for a subspace transformation based on the channel autocorrelation matrix. Additionally, the processing circuitry 120 is configured to generate a subspace transformed channel autocorrelation matrix, at least one subspace transformed channel cross-correlation vector, and a plurality of subspace transformed pilot symbols, by applying the subspace mapping to the channel autocorrelation matrix, the channel cross-correlation vector, and to the plurality of pilot symbols. Additionally, the processing circuitry 120 is configured to generate a plurality of subspace channel estimation filter coefficients based on the subspace transformed channel autocorrelation matrix and the subspace transformed channel cross-correlation vector. Additionally, the processing circuitry 120 is configured to generate an estimate of at least one channel coefficient (e.g., a first channel coefficient) of the communication channel based on the subspace transformed pilot symbols and the subspace channel estimation filter coefficients. Furthermore, the channel estimation circuit 701 comprises an output interface 150 configured to provide the estimate of the at least one channel coefficient. Moreover, the telecommunication device 700 comprises a receiver 702 configured to receive signals from the communication channel and to provide the received signals to the input interface 110 of the channel estimation circuit 701.

For example, the receiver 702 can receive signals from the communication channel that carry pilot symbols and provide the received pilot symbols to the input interface 110 of the channel estimation circuit 701. The channel estimation circuit 701 can then provide accurate estimates of channel coefficients, which can make telecommunication of the telecommunication device 700 more reliable and/or increase data throughput of the telecommunication device 700.

To this end, the telecommunication device 700 can additionally comprise an equalization circuit configured to generate a digital equalization filter for the communication channel based on an estimate of at least one channel coefficient provided by the channel estimation circuit 701. This digital equalization filter can reverse or at least reduce distortions (for example due to multipath propagation effects and/or Doppler shifts) of signals received by the receiver 702 from the communication channel.

The channel estimation circuit 701 may be similar to the channel estimation circuit 100 of FIG. 1 and can optionally comprise additional features of the channel estimation circuit 100 as illustrated in the context of FIGS. 1-6c.

In some examples, the telecommunication device 700 may be a mobile telecommunication device. To this end, the receiver 702 can be coupled to an antenna (not shown). Mobile telecommunication devices as disclosed in FIG. 7 using a channel estimation circuit according to the examples described herein may operate according to every known and future telecommunication standard, such as for example: one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (E-UTRAN), Long Term Evolution (LTE) or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. The terms mobile communication system and mobile communication network may be used synonymously.

A mobile telecommunication device may correspond to a smartphone, a cell phone, User Equipment (UE), a laptop, a notebook, a personal computer, a Personal Digital Assistant (PDA), a Universal Serial Bus (USB)-stick, a tablet computer, a car, etc. A mobile transmitter, transceiver or terminal may also be referred to as UE or user in line with the 3GPP terminology.

Moreover, the telecommunication device 700 may be a base station transmitter or a base station transceiver that can be located in the fixed or stationary part of the network or system. A base station transmitter or a base station transceiver may, for example, correspond to a remote radio head, a transmission point or an access point. A base station transmitter or a base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, or signals received from the base station transceiver to the mobile station transceiver, respectively.

Figure 8:
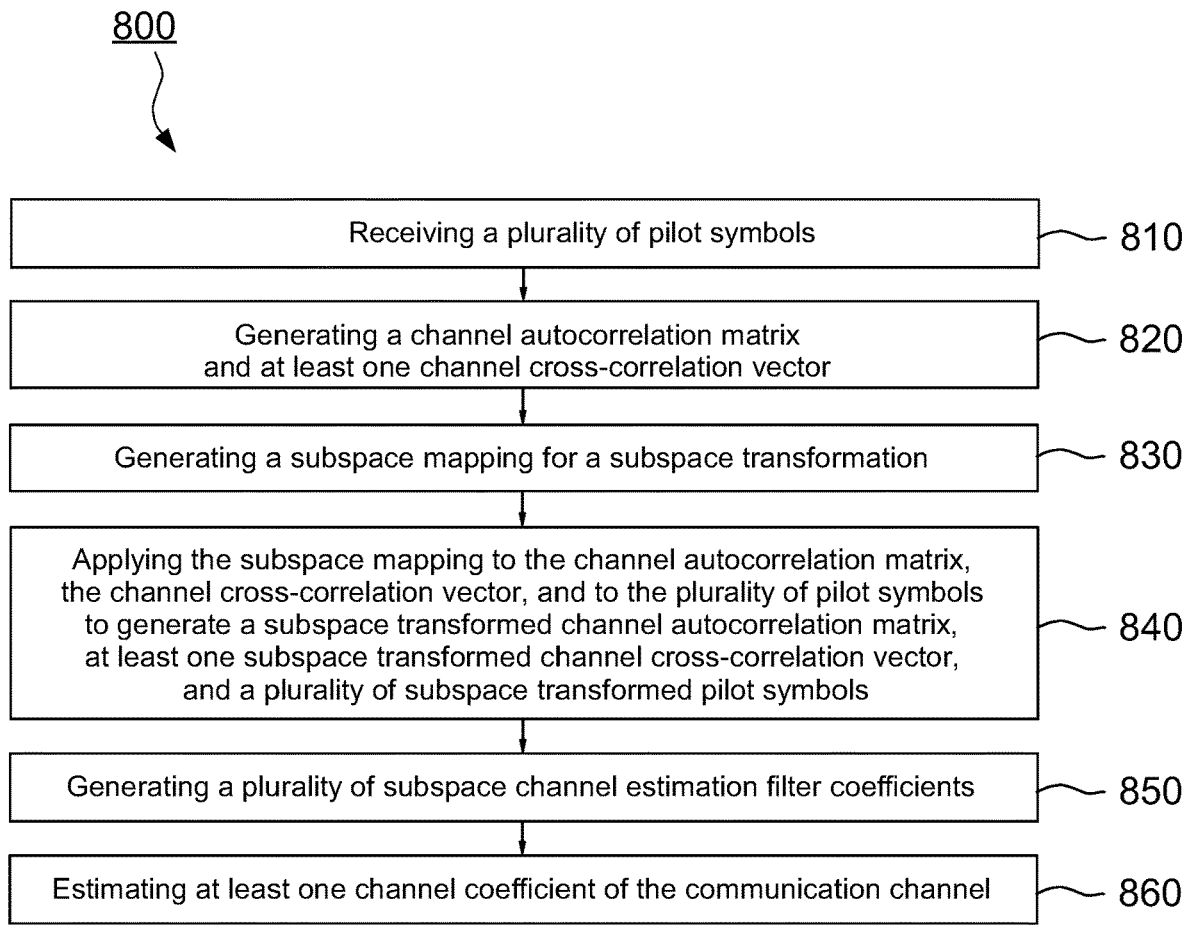
FIG. 8 shows a flow chart of a method for estimating a communication channel.

FIG. 8 shows a flow chart of a method 800 for estimating a communication channel. The method 800 comprises receiving 810 a plurality of pilot symbols from the communication channel. Furthermore, the method 800 comprises generating 820 a channel autocorrelation matrix and at least one channel cross-correlation vector associated with the communication channel. Generating 820 the channel autocorrelation matrix and the channel cross-correlation vector is based on predetermined statistical information on the communication channel. Furthermore, the method 800 comprises generating 830 a subspace mapping for a subspace transformation based on the channel autocorrelation matrix. Furthermore, the method 800 comprises applying 840 the subspace mapping to the channel autocorrelation matrix, the channel cross-correlation vector, and to the plurality of pilot symbols to generate a subspace transformed channel autocorrelation matrix, at least one subspace transformed channel cross-correlation vector, and a plurality of subspace transformed pilot symbols. Furthermore, the method 800 comprises generating 850 a plurality of subspace channel estimation filter coefficients based on the subspace transformed channel autocorrelation matrix and the subspace transformed channel cross-correlation vector. Furthermore, the method 800 comprises estimating 860 at least one channel coefficient of the communication channel based on the subspace transformed pilot symbols and the subspace channel estimation filter coefficients.

Generating 820 the channel autocorrelation matrix may comprise computing correlation coefficients between channel coefficients of radio resource elements of the communication channel that are associated with the plurality of pilot symbols. Furthermore, generating 820 the channel cross-correlation vector may comprise computing correlation coefficients between the channel coefficient to be estimated and channel coefficients of radio resource elements of the communication channel that are associated with the plurality of pilot symbols.

If optionally more than one channel coefficient is to be estimated, respective channel cross-correlation vectors for respective channel coefficients to be estimated can be generated according to method 800. A respective channel cross-correlation vector can comprise correlation coefficients between a respective channel coefficient to be estimated and the channel coefficients of the radio resource elements that are associated with the plurality of pilot symbols. Additionally, for the respective channel coefficient to be estimated a respective plurality of subspace channel estimation filter coefficients can be generated based on the subspace transformed channel autocorrelation matrix and the respective subspace transformed channel cross-correlation vector. The respective channel coefficient can then be estimated based on the subspace transformed pilot symbols and the respective plurality of subspace channel estimation filter coefficients.

The proposed channel estimation filtering in subspace domain (that can be optionally combined with one or more features explained in the context of FIGS. 1-7) can make subspace filtering a viable alternative to other channel estimation filtering techniques. For example, method 800 can reduce computational effort, memory requirements, and/or power consumption of a telecommunication device that estimates a communication channel. For example, method 800 relates to 4G+ subspace channel estimation.

For example, the flow chart of FIG. 8 shows a logical flow of the method 800 from which various algorithms may be derived without leaving the scope of this disclosure. For instance, generating the channel autocorrelation matrix and the at least one channel cross-correlation vector can be performed during an offline preprocessing prior to receiving 810 the plurality (or pluralities) of pilot symbols. Optionally, also generating 830 the subspace mapping can be performed during the offline preprocessing. Optionally, also applying the subspace mapping to the channel autocorrelation matrix and/or to the at least one channel cross-correlation vector to generate the subspace transformed channel autocorrelation matrix and/or the at least one subspace transformed channel cross-correlation vector, respectively, can be performed during the offline preprocessing. Optionally, also generating the plurality (or the pluralities) of subspace channel estimation filter coefficients (e.g., one or more sets of subspace channel estimation filter coefficients from one or more subspace transformed channel cross-correlation vectors, respectively, and from the channel autocorrelation matrix) can be performed during the offline preprocessing.

A plurality of subspace transformed pilot symbols can be generated upon reception of a plurality of pilot symbols (e.g., a received block of pilot symbols of the frequency-time plane) during an online processing. For example, each received plurality (e.g., each block) of pilot symbols can be subspace transformed by applying the subspace mapping, which may have been generated during the offline preprocessing. Furthermore, from each subspace transformed plurality of pilot symbols and from the plurality (or pluralities) of subspace channel estimation filter coefficients, which may have been generated during the offline preprocessing, one or more channel coefficients may be estimated during the online processing. It can then be avoided to generate the channel autocorrelation matrix and/or the one or more channel cross-correlation vectors and/or the subspace mapping and/or the subspace transformed channel autocorrelation matrix and/or the one or more subspace transformed channel cross-correlation vectors and/or the plurality (or pluralities) of subspace channel estimation filter coefficients each time a plurality (e.g., a block) of pilot symbols is received. This can save computational effort.

Optionally, the channel autocorrelation matrix and/or the one or more channel cross-correlation vectors and/or the subspace mapping and/or the subspace transformed channel autocorrelation matrix and/or the one or more subspace transformed channel cross-correlation vectors and/or the plurality (or pluralities) of subspace channel estimation filter coefficients may be regenerated in course of method 800, e.g., during the online processing, for example, when channel parameters (e.g., the maximal Doppler shift, the maximal delay spread, an SINR-profile, an SNR-profile, an SIR-profile, an average error vector magnitude, a bit error rate, and/or a symbol error rate) change by more than a respective predefined amount and/or rise or fall above a respective predefined threshold.

In the following, some examples are described. Example 1 is a channel estimation circuit comprising processing circuitry configured to generate a channel autocorrelation matrix and at least one channel cross-correlation vector based on predetermined statistical information on a communication channel, to generate a subspace mapping for a subspace transformation based on the channel autocorrelation matrix, to generate a subspace transformed channel autocorrelation matrix, at least one subspace transformed channel cross-correlation vector, and a plurality of subspace transformed pilot symbols, by applying the subspace mapping to the channel autocorrelation matrix, the channel cross-correlation vector, and to a plurality of received pilot symbols, to generate a plurality of subspace channel estimation filter coefficients based on the subspace transformed channel autocorrelation matrix and the subspace transformed channel cross-correlation vector, and to generate an estimate of at least one channel coefficient of the communication channel based on the subspace transformed pilot symbols and the subspace channel estimation filter coefficients.

In example 2, the subject matter of example 1 can optionally include the processing circuitry configured to generate the channel autocorrelation matrix by computing correlation coefficients between channel coefficients of radio resource elements of the communication channel that are associated with the plurality of pilot symbols.

In example 3, the subject matter of example 1 or 2 can optionally include the processing circuitry configured to generate the channel cross-correlation vector by computing correlation coefficients between the channel coefficient to be estimated and channel coefficients of radio resource elements of the communication channel that are associated with the plurality of pilot symbols.

In example 4, the subject matter of one of the examples 1 to 3 can optionally include the processing circuitry further configured to generate the estimate of the at least one channel coefficient being associated with a radio resource element of the communication channel that is different from any radio resource element associated with the plurality of pilot symbols.

In example 5, the subject matter of one of the examples 1 to 4 can optionally include the processing circuitry configured to generate the subspace mapping by computing eigenvalues and eigenvectors of the channel autocorrelation matrix and using those eigenvectors for the subspace mapping whose corresponding eigenvalues are larger than a predefined threshold.

In example 6, the subject matter of example 5 can optionally include the processing circuitry further configured to set the predefined threshold larger than 0.1% of the largest eigenvalue of the channel autocorrelation matrix.

In example 7, the subject matter of one of the examples 1 to 6 can optionally include the processing circuitry further configured to compute a signal-to-interference-plus-noise ratio profile of the communication channel based on the plurality of pilot symbols and to scale the subspace mapping by the signal-to-interference-plus-noise ratio profile.

In example 8, the subject matter of one of the examples 1 to 7 can optionally comprise an input interface configured to receive measurement data of at least one of a maximal Doppler shift and a maximal delay spread of the communication channel, the processing circuitry further configured to generate the channel autocorrelation matrix and at least one channel cross-correlation vector based on at least one of the maximal Doppler shift and the maximal delay spread.

In example 9, the subject matter of one of the examples 1 to 8 can optionally comprise an input interface configured to receive measurement data of at least one Doppler power profile and a delay power profile of the communication channel, the processing circuitry further configured to generate the channel autocorrelation matrix and the channel cross-correlation vector based on at least one of the Doppler power profile and the delay power profile.

In example 10, the subject matter of one of the examples 1 to 9 can optionally comprise an input interface configured to receive measurement data of at least one signal-to-noise or signal-to-interference-plus-noise power profile of the plurality of pilot symbols.

In example 11, the subject matter of example 8 can optionally include the input interface further configured to limit the number of pilot symbols of the plurality of pilot symbols to cause a maximal frequency difference between two pilot symbols of the plurality of pilot symbols being smaller than 90% of a coherence bandwidth of the communication channel and being larger than 70% of the coherence bandwidth.

In example 12, the subject matter of example 8 or 11 can optionally include the input interface further configured to limit the number of pilot symbols of the plurality of pilot symbols to cause a maximal time difference between respective time slots of two pilot symbols of the plurality of pilot symbols being smaller than 90% of a coherence time of the communication channel and being larger than 70% of the coherence time.

In example 13, the subject matter of example 8, 11, or 12 can optionally include the input interface further configured to adapt the number of pilot symbols of the plurality of pilot symbols if at least one of the maximal Doppler shift and the maximal delay spread changes by more than 10%.

In example 14, the subject matter of example 3 can optionally include the processing circuitry further configured to generate a second channel cross-correlation vector by computing correlation coefficients between a second, different channel coefficient that is to be estimated and channel coefficients of radio resource elements that are associated with the plurality of pilot symbols, to generate a second subspace transformed channel cross-correlation vector by applying the subspace mapping to the second channel cross-correlation vector, to generate a second plurality of subspace channel estimation coefficients based on the subspace transformed channel autocorrelation matrix and the second subspace transformed channel cross-correlation vector, to generate an estimate of the second channel coefficient based on the plurality of subspace transformed pilot symbols and the second plurality of subspace channel estimation coefficients.

In example 15, the subject matter of example 3 can optionally comprise an input interface further configured to receive at least a second plurality of pilot symbols from the communication channel, the processing circuitry further configured to generate at least a second channel cross-correlation vector by computing correlation coefficients between a second, different channel coefficient that is to be estimated and channel coefficients of radio resource elements that are associated with the second plurality of pilot symbols, to generate at least a second subspace transformed channel cross-correlation vector and a second plurality of subspace transformed pilot symbols by applying the subspace mapping to the second channel cross-correlation vector and to the second plurality of pilot symbols, to generate a second plurality of subspace channel estimation filter coefficients based on the subspace transformed channel autocorrelation matrix and the second subspace transformed channel cross-correlation vector, and to generate an estimate of the second channel coefficient based on the second plurality of subspace transformed pilot symbols and the second plurality of subspace channel estimation filter coefficients.

In example 16, the subject matter of example 15 can optionally include the processing circuitry configured to generate the estimate of the second channel coefficient being associated with a radio resource element of the communication channel that is different from a radio resource element associated with the first channel coefficient.

In example 17, the subject matter of example 1 can optionally comprise an input interface configured to receive at least a second plurality of pilot symbols from the communication channel, the processing circuitry further configured to generate the channel cross-correlation vector by computing correlation coefficients between the channel coefficient to be estimated and channel coefficients of radio resource elements that are associated with the first or the second plurality of pilot symbols, to generate the channel autocorrelation matrix by computing correlation coefficients between channel coefficients of radio resource elements that are associated with the first or the second plurality of pilot symbols, to generate a second plurality of subspace transformed pilot symbols by applying the subspace mapping to the second plurality of pilot symbols, and to generate the estimate of the channel coefficient additionally based on the second plurality of subspace transformed pilot symbols.

In example 18, the subject matter of example 17 can optionally include the processing circuitry further configured to generate the estimate of the channel coefficient being associated with a radio resource element having a frequency that is at most as large as a maximum frequency of the first plurality of pilot symbols and is at least as large as a minimum frequency of the first plurality of pilot symbols, the radio resource element associated with the channel coefficient having a time slot that is to the earliest coincident with the earliest time slot of a pilot symbol of the first plurality of pilot symbols and is to the latest coincident with the latest time slot of a pilot symbol of the first plurality of pilot symbols.

In example 19, the subject matter of one of the examples 15 to 18 can optionally include the input interface further configured to partition a stream of pilot symbols from the communication channel into the first and at least the second plurality of pilot symbols.

In example 20, the subject matter of example 19 can optionally include the input interface configured to partition the stream of pilot symbols causing a minimal frequency difference between the first and the second plurality of pilot symbols being at most twice as large as a minimal frequency difference between two pilot symbols of the first plurality of pilot symbols.

In example 21, the subject matter of example 19 or 20 can optionally include the input interface is further configured to partition the received stream of pilot symbols causing a minimal time difference between respective time slots of the first and the second plurality of pilot symbols being at most twice as large as a minimal time difference between respective time slots of two pilot symbols of the first plurality of pilot symbols.

In example 22, the subject matter of example 17 or 18 can optionally include the processing circuitry further configured to generate a reduced plurality of subspace transformed pilot symbols by selecting subspace transformed pilot symbols from the first and at least the second plurality of subspace transformed pilot symbols, to generate a reduced subspace transformed channel autocorrelation matrix by selecting correlation coefficients from the subspace transformed channel autocorrelation matrix, to generate a reduced subspace transformed channel cross-correlation vector by selecting correlation coefficients from the subspace transformed channel cross-correlation vector, to generate the plurality of subspace channel estimation filter coefficients based on the reduced subspace transformed channel autocorrelation matrix and the reduced subspace transformed channel cross-correlation vector, and to generate the estimate of the channel coefficient based on the reduced plurality of subspace transformed pilot symbols and the plurality of subspace channel estimation filter coefficients.

In example 23, the subject matter of example 22 can optionally include the processing circuitry configured to generate the reduced plurality of subspace transformed pilot symbols by selecting all subspace transformed pilot symbols of the first plurality of subspace transformed pilot symbols and selecting those subspace transformed pilot symbols from the second plurality of subspace transformed pilot symbols whose corresponding eigenvalues of the channel autocorrelation matrix are larger than a predefined threshold.

In example 24, the subject matter of example 23 can optionally include the processing circuitry configured to set the predefined threshold larger than 0.2% of the largest eigenvalue of the channel autocorrelation matrix.

In example 25, the subject matter of example 23 or 24 can optionally include the processing circuitry further configured to generate a selection matrix for selecting the subspace transformed pilot symbols from the first and at least the second plurality of subspace transformed pilot symbols, to select the correlation coefficients from the subspace transformed channel autocorrelation matrix by applying the selection matrix to the subspace transformed channel autocorrelation matrix, and to select the correlation coefficients from the subspace transformed channel cross-correlation vector by applying the selection matrix to the subspace transformed channel cross-correlation vector.

Example 26 relates to a telecommunication device comprising a channel estimation circuit of one of the examples 1 to 25, and a receiver configured to receive signals from the communication channel and to provide the received signals to the input interface of the channel estimation circuit.

In example 27, the subject matter of example 26 can optionally include an equalization circuit configured to generate a digital equalization filter for the communication channel based on an estimate of at least one channel coefficient provided by the channel estimation circuit.

Example 28 relates to a method for estimating a communication channel, the method comprising receiving a plurality of pilot symbols from the communication channel, generating a channel autocorrelation matrix and at least one channel cross-correlation vector associated with the communication channel and based on predetermined statistical information on the communication channel, generating a subspace mapping for a subspace transformation based on the channel autocorrelation matrix, applying the subspace mapping to the channel autocorrelation matrix, the channel cross-correlation vector, and to the plurality of pilot symbols to generate a subspace transformed channel autocorrelation matrix, at least one subspace transformed channel cross-correlation vector, and a plurality of subspace transformed pilot symbols, generating a plurality of subspace channel estimation filter coefficients based on the subspace transformed channel autocorrelation matrix and the subspace transformed channel cross-correlation vector, and estimating at least one channel coefficient of the communication channel based on the subspace transformed pilot symbols and the subspace channel estimation filter coefficients.

In example 29, the subject matter of example 28 can optionally include generating the channel autocorrelation matrix comprising computing correlation coefficients between channel coefficients of radio resource elements of the communication channel that are associated with the plurality of pilot symbols.

In example 30, the subject matter of example 28 or 29 can optionally include generating the channel cross-correlation vector comprising computing correlation coefficients between the channel coefficient to be estimated and channel coefficients of radio resource elements of the communication channel that are associated with the plurality of pilot symbols.

In example 31, the subject matter of one of the examples 28 to 30 can optionally include a radio resource element associated with the channel coefficient to be estimated being different from any radio resource element associated with the plurality of pilot symbols.

In example 32, the subject matter of one of the examples 28 to 31 can optionally include generating the subspace mapping comprising computing eigenvalues and eigenvectors of the channel autocorrelation matrix and using those eigenvectors for the subspace mapping whose corresponding eigenvalues are larger than a predefined threshold.

In example 33, the subject matter of example 32 can optionally include the predefined threshold being set larger than 0.1% of the largest eigenvalue of the channel autocorrelation matrix.

In example 34, the subject matter of one of the examples 28 to 33 can optionally include generating the subspace mapping being additionally based on a signal-to-interference-plus-noise ratio profile of the communication channel.

In example 35, the subject matter of one of the examples 28 to 34 can optionally include measuring at least one of a maximal Doppler shift and a maximal delay spread of the communication channel, generating the channel autocorrelation matrix and the channel cross-correlation vector being based on at least one of the measured maximal Doppler shift and the measured maximal delay spread.

In example 36, the subject matter of example 35 can optionally include limiting the number of pilot symbols of the plurality of pilot symbols to cause a maximal frequency difference between any two pilot symbols of the plurality of pilot symbols being smaller than 90% of a coherence bandwidth of the communication channel and being larger than 70% of the coherence bandwidth.

In example 37, the subject matter of example 35 or 36 can optionally include limiting the number of pilot symbols of the plurality of pilot symbols to cause a maximal time difference between respective time slots of any two pilot symbols of the plurality of pilot symbols being smaller than 90% of a coherence time of the communication channel and being larger than 70% of the coherence time.

In example 38, the subject matter of one of the examples 35 to 37 can optionally include adapting the number of pilot symbols of the plurality of pilot symbols if at least one of the maximal Doppler shift and the maximal delay spread changes by more than 10%.

In example 39, the subject matter of example 30 can optionally include generating at least a second channel cross-correlation vector by determining correlation coefficients between a second, different channel coefficient that is to be estimated and channel coefficients of radio resource elements that are associated with the plurality of pilot symbols, applying the subspace mapping to the second channel cross-correlation vector to generate at least a second subspace transformed channel cross-correlation vector, generating a second plurality of subspace channel estimation coefficients based on the subspace transformed channel autocorrelation matrix and the second subspace transformed channel cross-correlation vector, and estimating the second channel coefficient based on the subspace transformed pilot symbols and the second plurality of subspace channel estimation filter coefficients.

In example 40, the subject matter of example 30 can optionally include receiving at least a second plurality of pilot symbols from the communication channel, at least one pilot symbol of the second plurality of pilot symbols being different from any pilot symbol of the first plurality of pilot symbols, generating at least a second channel cross-correlation vector by determining correlation coefficients between at least a second, different channel coefficient that is to be estimated and channel coefficients of radio resource elements that are associated with the second plurality of pilot symbols, applying the subspace mapping to the second channel cross-correlation vector and to the second plurality of pilot symbols to generate at least a second subspace transformed channel cross-correlation vector and a second plurality of subspace transformed pilot symbols, generating a second plurality of subspace channel estimation filter coefficients based on the subspace transformed channel autocorrelation matrix and the second subspace transformed channel cross-correlation vector, and estimating the second channel coefficient based on the second plurality of subspace transformed pilot symbols and the second plurality of subspace channel estimation coefficients.

In example 41, the subject matter of example 40 can optionally include the second channel coefficient being associated with a radio resource element different from the radio resource element associated with the first channel coefficient In example 42, the subject matter of example 40 or 41 can optionally include partitioning a stream of pilot symbols from the communication channel into the first and at least the second plurality of pilot symbols.

In example 43, the subject matter of example 28 can optionally include receiving at least a second plurality of pilot symbols from the communication channel, at least one pilot symbol of the second plurality of pilot symbols being different from any pilot symbol of the first plurality of pilot symbols, applying the subspace mapping to the second plurality of pilot symbols to generate a second plurality of subspace transformed pilot symbols, generating the channel cross-correlation vector comprising computing correlation coefficients between the channel coefficient to be estimated and channel coefficients of radio resource elements that are associated with the first or the second plurality of pilot symbols, generating the channel autocorrelation matrix comprising computing correlation coefficients between channel coefficients of radio resource elements that are associated with the first or the second plurality of pilot symbols, estimating the channel coefficient being additionally based on the second plurality of subspace transformed pilot symbols.

In example 44, the subject matter of example 43 can optionally include a frequency of the radio resource element associated with the channel coefficient that is to be estimated is at most as large as a maximum frequency of the first plurality of pilot symbols and is at least as large as a minimum frequency of the first plurality of pilot symbols, a time slot of the radio resource element associated with the channel coefficient that is to be estimated being to the earliest coincident with the earliest time slot of a pilot symbol of the first plurality of pilot symbols and being to the latest coincident with the latest time slot of a pilot symbol of the first plurality of pilot symbols.

In example 45, the subject matter of example 43 or 44 can optionally include each pilot symbol of the second plurality of pilot symbols being different from any pilot symbol the first plurality of pilot symbols.

In example 46, the subject matter of one of the examples 43 to 45 can optionally include a minimal frequency difference between the first and the second plurality of pilot symbols being at most twice as large as a minimal frequency difference between two pilot symbols of the first plurality of pilot symbols.

In example 47, the subject matter of one of the examples 43 to 46 can optionally include a minimal time difference between respective time slots of the first and the second plurality of pilot symbols being at most twice as large as a minimal time difference between respective time slots of two pilot symbols of the first plurality of pilot symbols.

In example 48, the subject matter of example 43 or 44 can optionally include selecting subspace transformed pilot symbols from the first and at least the second plurality of subspace transformed pilot symbols to generate a reduced plurality of subspace transformed pilot symbols, selecting correlation coefficients from the subspace transformed channel autocorrelation matrix to generate a reduced subspace transformed channel autocorrelation matrix, selecting correlation coefficients from the subspace transformed channel cross-correlation vector to generate a reduced subspace transformed channel cross-correlation vector, generating the plurality of subspace channel estimation filter coefficients being based on the reduced subspace transformed channel autocorrelation matrix and the reduced subspace transformed channel cross-correlation vector, and estimating the channel coefficient being based on the reduced plurality of subspace transformed pilot symbols and the plurality of subspace channel estimation coefficients.

In example 49, the subject matter of example 48 can optionally include selecting the subspace transformed pilot symbols comprising selecting all subspace transformed pilot symbols from the first plurality of subspace transformed pilot symbols and selecting those subspace transformed pilot symbols from the second plurality of subspace transformed pilot symbols whose corresponding eigenvalues of the channel autocorrelation matrix are larger than a predefined threshold.

In example 50, the subject matter of example 49 can optionally include the predefined threshold being larger than 0.2% of the largest eigenvalue of the channel autocorrelation matrix.

In example 51, the subject matter of example 49 or 50 can optionally include generating a selection matrix for selecting the subspace transformed pilot symbols from the first and at least the second plurality of subspace transformed pilot symbols, selecting the correlation coefficients from the subspace transformed channel autocorrelation matrix comprising applying the selection matrix to the subspace transformed channel autocorrelation matrix, and selecting the correlation coefficients from the subspace transformed channel cross-correlation vector comprising applying the selection matrix to the subspace transformed channel cross-correlation vector.

Example 52 relates to a computer program including program code, when executed, to cause a machine to perform the method of one of examples 28 to 51.

Example 53 relates to a non-transitory machine readable storage medium including program code, when executed, to cause a machine to perform the method of one of examples 28 to 51.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance, for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A channel estimation circuit, comprising:
   processing circuitry configured
      to generate a channel autocorrelation matrix and at least one channel cross-correlation vector based on predetermined statistical information on a communication channel,
      to generate a subspace mapping for a subspace transformation based on the channel autocorrelation matrix,
      to generate a subspace transformed channel autocorrelation matrix, at least one subspace transformed channel cross-correlation vector, and a plurality of subspace transformed pilot symbols, by applying the subspace mapping to the channel autocorrelation matrix, the channel cross-correlation vector, and to a plurality of received pilot symbols,
      to generate a plurality of subspace channel estimation filter coefficients based on the subspace transformed channel autocorrelation matrix and the subspace transformed channel cross-correlation vector, and
      to generate an estimate of at least one channel coefficient of the communication channel based on the subspace transformed pilot symbols and the subspace channel estimation filter coefficients.

2. The channel estimation circuit of claim 1, wherein the processing circuitry is configured to generate the channel autocorrelation matrix by computing correlation coefficients between channel coefficients of radio resource elements of the communication channel that are associated with the plurality of pilot symbols.

3. The channel estimation circuit of claim 1, wherein the processing circuitry is configured to generate the channel cross-correlation vector by computing correlation coefficients between the channel coefficient to be estimated and channel coefficients of radio resource elements of the communication channel that are associated with the plurality of pilot symbols.

4. The channel estimation circuit of claim 1, wherein the processing circuitry is further configured to compute a signal-to-interference-plus-noise ratio profile of the communication channel based on the plurality of pilot symbols and to scale the subspace mapping by the signal-to-interference-plus-noise ratio profile.

5. The channel estimation circuit of claim 1, further comprising an input interface configured to receive measurement data of at least one of a maximal Doppler shift and a maximal delay spread of the communication channel, wherein the processing circuitry is further configured to generate the channel autocorrelation matrix and at least one channel cross-correlation vector based on at least one of the maximal Doppler shift and the maximal delay spread.

6. The channel estimation circuit of claim 1, further comprising an input interface configured to receive measurement data of at least one Doppler power profile and a delay power profile of the communication channel, wherein the processing circuitry is further configured to generate the channel autocorrelation matrix and the channel cross-correlation vector based on at least one of the Doppler power profile and the delay power profile.

7. The channel estimation circuit of claim 5, wherein the input interface is further configured to limit the number of pilot symbols of the plurality of pilot symbols to cause a maximal frequency difference between two pilot symbols of the plurality of pilot symbols being smaller than 90% of a coherence bandwidth of the communication channel and being larger than 70% of the coherence bandwidth.

8. The channel estimation circuit of claim 5, wherein the input interface is further configured to adapt the number of pilot symbols of the plurality of pilot symbols if at least one of the maximal Doppler shift and the maximal delay spread changes by more than 10%.

9. The channel estimation circuit of claim 1, further comprising an input interface configured to receive at least a second plurality of pilot symbols from the communication channel,
   wherein the processing circuitry is further configured
      to generate the channel cross-correlation vector by computing correlation coefficients between the channel coefficient to be estimated and channel coefficients of radio resource elements that are associated with the first or the second plurality of pilot symbols,
      to generate the channel autocorrelation matrix by computing correlation coefficients between channel coefficients of radio resource elements that are associated with the first or the second plurality of pilot symbols, to generate a second plurality of subspace transformed pilot symbols by applying the subspace mapping to the second plurality of pilot symbols, and to generate the estimate of the channel coefficient additionally based on the second plurality of subspace transformed pilot symbols.

10. The channel estimation circuit of claim 9, wherein the processing circuitry is further configured to generate the estimate of the channel coefficient being associated with a radio resource element having a frequency that is at most as large as a maximum frequency of the first plurality of pilot symbols and is at least as large as a minimum frequency of the first plurality of pilot symbols, and wherein the radio resource element associated with the channel coefficient has a time slot that is to the earliest coincident with the earliest time slot of a pilot symbol of the first plurality of pilot symbols and is to the latest coincident with the latest time slot of a pilot symbol of the first plurality of pilot symbols.

11. The channel estimation circuit of claim 9, wherein the input interface is further configured to partition a stream of pilot symbols from the communication channel into the first and at least the second plurality of pilot symbols.

12. The channel estimation circuit of claim 11, wherein the input interface is configured to partition the stream of pilot symbols causing a minimal frequency difference between the first and the second plurality of pilot symbols being at most twice as large as a minimal frequency difference between two pilot symbols of the first plurality of pilot symbols.

13. The channel estimation circuit of claim 9, wherein the processing circuitry is further configured to generate a reduced plurality of subspace transformed pilot symbols by selecting subspace transformed pilot symbols from the first and at least the second plurality of subspace transformed pilot symbols, to generate a reduced subspace transformed channel autocorrelation matrix by selecting correlation coefficients from the subspace transformed channel autocorrelation matrix, to generate a reduced subspace transformed channel cross-correlation vector by selecting correlation coefficients from the subspace transformed channel cross-correlation vector, to generate the plurality of subspace channel estimation filter coefficients based on the reduced subspace transformed channel autocorrelation matrix and the reduced subspace transformed channel cross-correlation vector, and to generate the estimate of the channel coefficient based on the reduced plurality of subspace transformed pilot symbols and the plurality of subspace channel estimation filter coefficients.

14. The channel estimation circuit of claim 13, wherein the processing circuitry is configured to generate the reduced plurality of subspace transformed pilot symbols by selecting all subspace transformed pilot symbols of the first plurality of subspace transformed pilot symbols and selecting those subspace transformed pilot symbols from the second plurality of subspace transformed pilot symbols whose corresponding eigenvalues of the channel autocorrelation matrix are larger than a predefined threshold.

15. The channel estimation circuit of claim 14, wherein the processing circuitry is configured to set the predefined threshold larger than 0.2% of the largest eigenvalue of the channel autocorrelation matrix.

16. The channel estimation circuit of claim 14, wherein the processing circuitry is further configured to generate a selection matrix for selecting the subspace transformed pilot symbols from the first and at least the second plurality of subspace transformed pilot symbols, to select the correlation coefficients from the subspace transformed channel autocorrelation matrix by applying the selection matrix to the subspace transformed channel autocorrelation matrix, and to select the correlation coefficients from the subspace transformed channel cross-correlation vector by applying the selection matrix to the subspace transformed channel cross-correlation vector.

17. A telecommunication device comprising:
a channel estimation circuit, comprising
processing circuitry configured
to generate a channel autocorrelation matrix and at least one channel cross-correlation vector based on predetermined statistical information on a communication channel,
to generate a subspace mapping for a subspace transformation based on the channel autocorrelation matrix,
to generate a subspace transformed channel autocorrelation matrix, at least one subspace transformed channel cross-correlation vector, and a plurality of subspace transformed pilot symbols, by applying the subspace mapping to the channel autocorrelation matrix, the channel cross-correlation vector, and to a plurality of received pilot symbols,
to generate a plurality of subspace channel estimation filter coefficients based on the subspace transformed channel autocorrelation matrix and the subspace transformed channel cross-correlation vector, and
to generate an estimate of at least one channel coefficient of the communication channel based on the subspace transformed pilot symbols and the subspace channel estimation filter coefficients; and
a receiver configured to receive signals from the communication channel and to provide the received signals to the channel estimation circuit.

18. The telecommunication device of claim 17 further comprising an equalization circuit configured to generate a digital equalization filter for the communication channel based on an estimate of at least one channel coefficient provided by the channel estimation circuit.

19. A method for estimating a communication channel, comprising:
receiving a plurality of pilot symbols from the communication channel;
generating a channel autocorrelation matrix and at least one channel cross-correlation vector associated with the communication channel and based on predetermined statistical information on the communication channel;
generating a subspace mapping for a subspace transformation based on the channel autocorrelation matrix;
applying the subspace mapping to the channel autocorrelation matrix, the channel cross-correlation vector, and to the plurality of pilot symbols to generate a subspace transformed channel autocorrelation matrix, at least one subspace transformed channel cross-correlation vector, and a plurality of subspace transformed pilot symbols;

generating a plurality of subspace channel estimation filter coefficients based on the subspace transformed channel autocorrelation matrix and the subspace transformed channel cross-correlation vector; and estimating at least one channel coefficient of the communication channel based on the subspace transformed pilot symbols and the subspace channel estimation filter coefficients.

20. The method of claim 19 further comprising receiving at least a second plurality of pilot symbols from the communication channel, wherein at least one pilot symbol of the second plurality of pilot symbols is different from any pilot symbol of the first plurality of pilot symbols, applying the subspace mapping to the second plurality of pilot symbols to generate a second plurality of subspace transformed pilot symbols, wherein generating the channel cross-correlation vector comprises computing correlation coefficients between the channel coefficient to be estimated and channel coefficients of radio resource elements that are associated with the first or the second plurality of pilot symbols, wherein generating the channel autocorrelation matrix comprises computing correlation coefficients between channel coefficients of radio resource elements that are associated with the first or the second plurality of pilot symbols, wherein estimating the channel coefficient is additionally based on the second plurality of subspace transformed pilot symbols.

\* \* \* \* \*